United States Patent
Hahn et al.

(10) Patent No.: US 7,843,509 B2
(45) Date of Patent: Nov. 30, 2010

(54) ITERATIVE METHOD OF INTERPOLATING IMAGE INFORMATION VALUES

(75) Inventors: Marko Hahn, Neubiberg (DE); Markus Schu, Erding (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1054 days.

(21) Appl. No.: 11/540,484

(22) Filed: Sep. 28, 2006

(65) Prior Publication Data

US 2007/0236601 A1 Oct. 11, 2007

(30) Foreign Application Priority Data

Sep. 29, 2005 (DE) .................... 10 2005 046 772 U

(51) Int. Cl.
*H04N 7/01* (2006.01)
*H04N 11/20* (2006.01)

(52) U.S. Cl. ................... 348/448; 348/452; 382/265

(58) Field of Classification Search ......... 348/441–459; 382/299–301, 265
See application file for complete search history.

(56) References Cited

U.S. PATENT DOCUMENTS

| | | | | |
|---|---|---|---|---|
| 5,148,269 | A | 9/1992 | de Haan et al. | 358/105 |
| 5,579,053 | A | 11/1996 | Pandel | 7/1 |
| 5,929,918 | A | 7/1999 | Marques Pereira et al. | 348/448 |
| 6,229,570 | B1 | 5/2001 | Bugwadia et al. | 348/441 |
| 6,731,342 | B2 * | 5/2004 | Shin et al. | 348/452 |
| 6,967,687 | B1 * | 11/2005 | Suga | 348/441 |

(Continued)

FOREIGN PATENT DOCUMENTS

EP 0584662 3/1994 ............ 5/44

OTHER PUBLICATIONS

Meisinger et al., "Spatial Error Concealment of Corrupted Image Data Using frequency Selective Extrapolation" [Örtliche Fehlerverschleierung von gestört empfangenen Bilddaten durch frequenzselektive Extrapolation]. Electronic Media: $10^{th}$ Dortmund Television Seminar, ITG-Fachbericht 179, pp. 189-194, Sep. 2003.

(Continued)

*Primary Examiner*—M. Lee
(74) *Attorney, Agent, or Firm*—O'Shea Getz P.C.

(57) ABSTRACT

The invention relates to an iterative method for determining an interpolated image information value in an image that comprises a number of image regions arranged in a matrix-like fashion having original image regions to which one image information value has been assigned, and having at least one image region to be interpolated. In order to determine an interpolated image information value, the method specifies a starting interpolation direction and determines a quality measure for the starting interpolation direction. At least one image direction is selected different from the starting interpolation direction and determining a quality measure for this at least one image direction. The quality measures for the starting interpolation direction are compared and the at least one image direction different from the starting interpolation direction, selecting as the interpolation direction the starting interpolation direction or the at least one image direction, and determining the interpolated image information value using image regions that are located in the interpolation direction adjacent to the to-be-interpolated first image region. The steps of selecting and comparing are repeated at least once.

19 Claims, 17 Drawing Sheets

U.S. PATENT DOCUMENTS

| | | | |
|---|---|---|---|
| 7,190,406 B2 * | 3/2007 | Ji et al. | 348/448 |
| 7,336,315 B2 * | 2/2008 | Kang et al. | 348/448 |
| 2003/0218621 A1 | 11/2003 | Jiang | 345/698 |
| 2004/0071313 A1 | 4/2004 | Hahn et al. | 382/100 |
| 2004/0100579 A1 | 5/2004 | Hahn et al. | 348/448 |
| 2004/0257467 A1 | 12/2004 | Nicolas | 11/20 |
| 2005/0073607 A1 | 4/2005 | Ji et al. | 348/448 |
| 2005/0134730 A1 | 6/2005 | Winger et al. | 11/20 |
| 2005/0162548 A1 * | 7/2005 | Kang et al. | 348/448 |

OTHER PUBLICATIONS

De Haan et al., "Deinterlacing-An Overview," Proceedings of the IEEE, vol. 86, No. 9, pp. 1839-1857, Sep. 1998.

* cited by examiner

ITERATIVE METHOD OF INTERPOLATING IMAGE INFORMATION VALUES

PRIORITY INFORMATION

This patent application claims priority from German patent application 10 2005 046 772.5 filed Sep. 29, 2005, which is hereby incorporated by reference.

BACKGROUND INFORMATION

This invention relates to an iterative interpolation method for determining at least one interpolated image information value in an image that has a number of image regions arranged in a matrix-like fashion, comprising original image regions, to which one image information value has already been assigned, and comprising at least one image region to be interpolated.

In image processing, interpolation methods to determine an image information value for an image region are required for a variety of applications.

One application is the generation of frames from fields transmitted in the field of television engineering. Here, one interline with a number of pixels is interpolated between every two lines of a given field so as to obtain a frame. An interpolation method for generating such interlines is described, for example, in German patent applications DE 102 36 208 A1 (Hahn et al.) or DE 102 32 372 A1 (Hahn et al.).

Another application for an interpolation method is to increase image resolution. Here additional lines and columns are generated by interpolation between existing lines and columns of an image so as to increase image resolution. A method for this is described, for example, in U.S. Pat. No. 6,229,570 B1 (Bugwadia et al.).

Interpolation methods are also required for image transmission processes in which an image to be transmitted is divided into image blocks, then transmitted block by block. If a block is not transmitted due to a transmission error, its image content must be interpolated on the receiver side. One method for achieving this is described, for example, in Meisinger, Kaup: "Spatial Error Concealment of Corrupted Image Data Using Frequency Selective Extrapolation" [Örtliche Fehlerverschleierung von gestört empfangenen Bilddaten durch frequenzselektive Extrapolation], Electronic Media: 10th Dortmund Television Seminar, ITG-Fachbericht 179, pages 189-194, September 2003.

Another application for interpolation methods in image processing is increasing the resolution of a motion vector field. An approach is sufficiently known in image processing whereby an image that is part of an image sequence having multiple successive images is subdivided into individual image blocks and a motion estimation method is used to assign a motion vector to each of these image blocks. These vectors together form a motion vector field. This type of motion vector assigned to a block contains information indicating at which position the content of this block is located within the previous and/or following image of the image sequence. This information can be utilized for the motion-correct generation of intermediate images between two images of an image sequence. In motion estimation, it is desirable to obtain the smallest possible blocks to which each motion vector is assigned. This does, however, increase the computational cost of the motion estimation.

A known approach to limiting this computational cost is to increase the resolution of the vector field by dividing the initially present image blocks into smaller blocks to which motion vectors are assigned using an interpolation method that takes into account the motion vectors of the original larger blocks. One method for achieving this is described in U.S. Pat. No. 5,148,269 (de Haan et al.).

The goal of the invention is to provide an improved interpolation method for determining at least one interpolated image information value in an image that has a number of image regions arranged in a matrix-like fashion having original image regions to which an image information value has already been assigned, and having at least one image region to be interpolated.

SUMMARY OF THE INVENTION

The method according to the invention is applied to an image that is subdivided into a number of image regions, out of which one image information value each has already been assigned to some of the image regions. These image regions to which an image information value has already been assigned—that is, for which no image information value need be interpolated—are designated below as "original image regions."

The image also contains at least one image region to be interpolated for which an image information value is to be interpolated. This image information value is designated below as an "interpolated image information value."

Each image region comprises at least one pixel, that is, can be composed of a single pixel or multiple pixels arranged in a matrix-like fashion. An image region having multiple pixels is designated below as an "image block."

In connection with the present invention, an image information value can include a luminance value (brightness value), a chrominance value (color value), or also a motion vector value, where the latter two can comprise two motion vector components.

In order to determine the interpolated image information value, an iterative method according to the invention comprises the following method steps:

a) specifying a starting interpolation direction;

b) determining a quality measure for the starting interpolation direction, which measure is a function of the image information values of at least one group of image regions which are located adjacent to each other in the starting interpolation direction and which are located adjacent to the first image region to be interpolated;

c) selecting at least one image direction different from the starting interpolation direction and determining a quality measure for this at least one image direction, which measure is a function of image information values from at least one group of image regions which are located adjacent to each other in this image direction, and which are located adjacent to the image region to be interpolated;

d) comparing the quality measures for the starting interpolation direction and the at least one image direction different from the starting interpolation direction, selecting as the interpolation direction the starting interpolation direction or the at least one image direction as a function of the comparison result, and determining the interpolated image information value using image regions that are located adjacent to the to-be-interpolated first image region in the interpolation direction or in a filtered interpolation direction obtained by filtering the interpolation direction;

e) repeating method steps c) and d) at least once, wherein during the repeated implementation of method step c) the interpolation direction and quality measure of this interpolation direction from the previous method step d) are employed as the starting interpolation direction and as the quality measure of the starting interpolation direction.

What is designated as an "interpolation direction" is a certain interpolation direction in which the image regions are located adjacent to each other, the image information values of these image regions being utilized to determine the interpolated image information value.

The quality measure for an image direction that is determined based on at least one group of image regions located adjacent within this image direction is determined such that it contains information as to how strongly the image information values of this group deviate from each other. A direction here is deemed to be that much better, or the "quality" of this direction is deemed to be that much higher, the less the image information values adjacent in this direction deviate from each other. The quality measure here can be generated so that it either increases with the increasing quality of an image direction or decreases with the increasing quality of an image direction.

In the comparison of the quality measures in method step d), that image direction is selected as the interpolation direction for which the comparison of the quality measures produces the highest quality.

One approach to determining a quality measure for an image direction wherein at least one group of image regions comprises passing the image information values of these image regions through a high-pass filter to obtain a high-pass filter value. The absolute value of this high-pass filter value, or a power of this high-pass filter value with an exponent that is a multiple of two, forms the quality measure. In such a determination of the quality measure, its value becomes that much smaller the less the image information values of the image regions of the examined group deviate from each other.

A quality measure determined using a group of image regions is hereinafter designated as an "individual quality measure." Preferably, multiple individual quality measures are determined for the purpose of determining the quality measure for an image direction; in other words, multiple groups of image regions are examined which are located adjacent within this image direction. The "individual quality measures" here are, for example, added together to obtain the quality measure for the image direction.

Before the individual quality measures are added, a possible approach is to weight these individual quality measures—specifically, as a function of the distance the individual groups are removed from the to-be-interpolated image region. The individual quality measures of groups located close to the to-be-interpolated image region are weighted here more strongly than those located further away.

In each iterative step the qualities of at least two image directions are compared, specifically, the quality of the image direction forming the starting interpolation direction and the quality of at least one additional image direction different from the starting interpolation direction, so as ultimately to supply an interpolated image information value. This interpolated image information value represents the final image information value which is assigned to the to-be-interpolated image region.

Method steps c) and d) are preferably repeated until a specified end condition has been reached. According to this embodiment, the end condition has been reached when a specified number of iteration steps have been performed. According to another embodiment, the end condition has been reached when the quality measure of the image direction selected as the interpolation direction has met a specified quality criterion, in other words, when the quality value lies above or below—depending on the manner of determining the quality value—a predetermined threshold value.

Another possible approach is to combine the previously described end conditions whereby the presence of the end condition is assumed when one of the previously described end conditions has been reached.

The image region assigned to the to-be-interpolated image region and utilized for the interpolation can change with each iteration step. To the extent the to-be-interpolated image region is part of the at least one group of image regions examined for the determination of the quality measure, the quality measure of this one image direction can also change from iteration step to iteration step such that a comparison of the quality measures of two image directions can yield different results as a function of the number of iteration steps performed. Nevertheless, preferably a new image direction is examined by determining the quality measure with each iteration step, where the previous best image direction, that is, the image direction with the best quality measure, is used as the starting interpolation direction during an interpolation step.

Preferably, the image directions examined during an interpolation step are selected such that an angle between the first starting interpolation direction specified at the beginning of the procedure in step a) and the image direction examined during an interpolation step becomes larger with each additional interpolation step.

In one embodiment, during one of the interpolation steps at least two image directions are examined by determining the associated quality measures, which image directions are symmetrical relative to the first starting interpolation direction specified at the beginning.

Generation of the interpolated image information value using image information values of the image regions located adjacent to each other can be implemented, for example, by conventional filtering measures, for example, low-pass filtering of the image information values of these image regions.

The groups of image regions utilized to determine the quality measure for an image direction can be selected so that they contain the to-be-interpolated image region. What is used here as the image information value of the to-be-interpolated image region is the interpolated image information value from the respective previous iteration step. In this case, a starting interpolation value is generated at the beginning of the procedure, when no iteration step has yet been run through completely. To this end, image information values for those image regions are generated which are located within the starting interpolation direction adjacent to each other and adjacent to the to-be-interpolated image region. This starting interpolation value can be utilized in the determination of the quality measure for the starting interpolation direction or the at least one additional image direction.

The at least one group of image regions which is examined to determine the quality measure for the image direction can comprise at least one additional to-be-interpolated image region. In this case, the method implemented in parallel for the to-be-interpolated image region and this at least one additional to-be-interpolated image region in such a way that for the at least one additional to-be-interpolated image region an interpolation value is determined even before the quality measures for the starting interpolation direction and the at least one additional image direction have been determined for the to-be-interpolated image region during the determination of the interpolated image information value.

The group of image regions that are located adjacent to each other in the interpolation direction, and the image information values of which used to determine the interpolated image information value, are preferably selected such that they are original image regions.

The method can be employed in manifold ways in image processing. For example, there is the possibility of employing this method for interline interpolation as already described. The image here comprises a number of original lines, each comprising a number of pixels to which one image information value each is assigned. Between two original lines, at least one interline must be interpolated here which comprises a number of pixels to be interpolated. The individual pixels here form one image region each for the implementation of the method, and the method is applied to each pixel of an interline to be interpolated.

The method can also be employed to increase resolution during motion estimation. An image is here subdivided into a number of first image blocks to which one motion vector each is assigned. Then the image is subdivided into a number of smaller second image blocks, and preferably such that a first group of second image blocks is created which in each case lies completely within a first image block, and such that a second group of second image blocks is created which is formed by sections of the two adjacent first image blocks. The second image blocks of the first group form original image regions for the implementation of the method, to which original regions the motion vectors of the respective first image blocks are assigned, while the second image blocks form to-be-interpolated image regions for the implementation of the method.

Motion vectors typically comprise two motion vector components. In order to resolve the motion estimate, the method is preferably performed twice, that is, separately for the first motion vector component and the second motion vector component. In addition, it is possible to perform the method multiple times successively to increase the resolution of the motion vector field with each implementation of the procedure until in the extreme case such a high resolution has been attained that a single independent motion vector is assigned to each individual pixel.

The method is also suitable for interpolating image blocks which during the transmission of image data have either not been transmitted or have been transmitted incorrectly. To the extent this image block to be interpolated comprises multiple pixels arranged in a matrix-like fashion, the method is preferably performed multiple times successively, the size of the to-be-interpolated image regions being reduced with each implementation of the method.

Preferably, the image block to be interpolated is assumed to be a to-be-interpolated image region, and a common image information value—that is, a common brightness value or chrominance value—is assigned by the method to this image region. To this end, the resolution of the correctly transmitted image blocks of the image is initially coarsened, that is, in the surrounding area of the image block to be interpolated individual pixels are combined to form image blocks of the same size as the image block to be interpolated, and one image information value is assigned to each of these image blocks, for example, by low-pass filtering the image information values of the individual pixels of the given image block. The image blocks thus created form original image regions for the implementation of the method.

In a next step, the resolution of the image block to be interpolated is reduced by subdividing the image block into multiple smaller image blocks which correspond to the image regions for the method. In analogous fashion, the resolution of the correctly transmitted image blocks surrounding the image block to be interpolated is enlarged and the method is once again implemented for the "smaller" to-be-interpolated image regions of the entire image block to be interpolated.

The method according to the invention is then repeated until the same resolution is attained for the image block to be interpolated as for its surrounding area.

These and other objects, features and advantages of the present invention will become more apparent in light of the following detailed description of preferred embodiments thereof, as illustrated in the accompanying drawings.

DETAILED DESCRIPTION OF THE INVENTION

In the figures, unless otherwise indicated, identical reference notations designate identical image regions and image signals of the same meaning.

The following discussion explains the method in more detail based on an example for effecting interpolation of an interline between two original lines of an image.

Figure 1A:
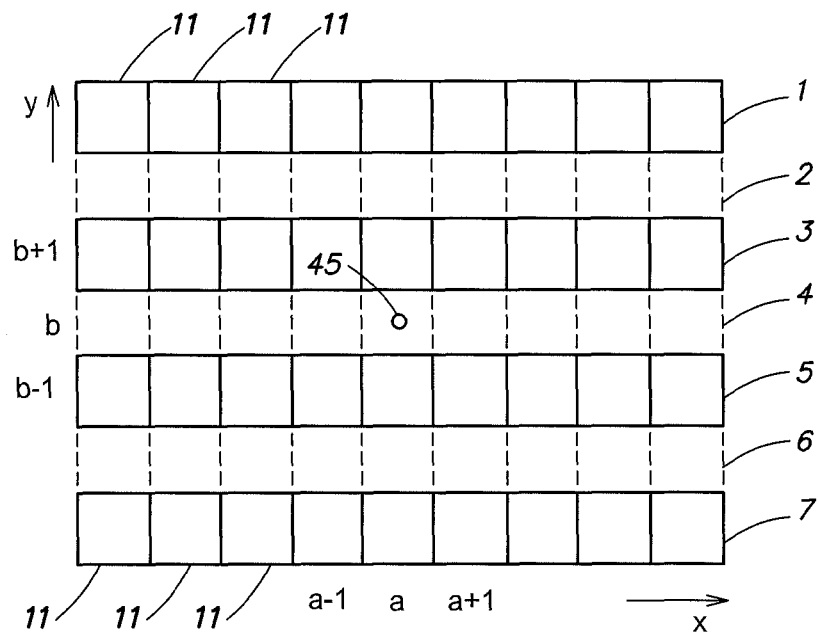
FIGS. 1a-1g illustrate the method based on an example for effecting interline interpolation.

FIG. 1a pictorially illustrates a section of this image having original image lines 1, 3, 5, 7 that are subdivided into a number of pixels 11. These image lines 1, 3, 5, 7 are, for example, image lines of a field as known from television transmission. In order to increase the image resolution or improve the rendition of the image, it is desirable to interpolate between two original lines 1, 3, 5, 7 one additional line each, 2, 4, 6, which is designated hereinafter as an interline and which in each case comprises a number of pixels. The pixels of the original image lines 1, 3, 5, 7 are represented in FIG. 1a as squares with solid lines, while the pixels of interlines 2, 4, 6 are represented as squares with partially broken lines.

The original image lines 1, 3, 5, 7 with the original pixels, and the interlines to be interpolated 2, 4, 6 with the pixels to be interpolated, are part of an image in which the original pixels and the to-be-interpolated pixels are arranged in a matrix-like fashion. In the example, original image lines and interlines 1-7 are arranged vertically one above the other. A first direction of the pixel matrix corresponding to the horizontal direction is hereinafter designated as the x-direction, while a second direction running vertically relative to the first direction is hereinafter designated as the y-direction.

Each of the pixels of this image matrix forms an image region to which region an image information value has already been assigned if the pixel is an original pixel, or to which an image information value has been assigned by interpolation. This image information value can be a luminance value or a chrominance value.

Image directions can be defined in the image shown as a section in FIG. 1a which comprises image regions arranged in a matrix-like fashion, in this case pixels. For purposes of describing such an image direction, the discussion below uses the following notation:

$$r=(dx,dy) \quad (1).$$

The term r here denotes the image direction, or a director; dx and dy denote the components of this image direction or director in the x-direction and the y-direction. In the following discussion, the respective smallest integer-based numerical values that can be used to describe the respective image direction are used for dx and dy. The image direction $r=(0,1)$ describes, for example, the vertical direction, while $r=(1,0)$ describes the horizontal direction.

In addition, a pixel 45 of the interline 4 is considered for which the following discussion describes the determination of an interpolated image information value. This pixel 45 is located in the pixel matrix shown in FIG. 1a at a position (a, b). In general hereinafter the term S(.,.) denotes the image information value of a pixel at the position (.,.)—specifically, both the image information value of an original pixel and the image information value of a pixel to be interpolated.

At the start of the method, a starting interpolation direction is defined and a quality measure is determined for this starting interpolation direction. This is described below with reference to FIG. 1b.

In the example, the vertical image direction $r=(0,1)$ is selected as the starting interpolation direction, although any given other image direction can also be selected as the starting interpolation direction. However, considering the fact that in this case the image information values need to be interpolated for those pixels lying between pixels vertically for which image information values are present, the horizontal direction $r=(1,0)$ is less appropriate as the starting interpolation direction.

Figure 1B:
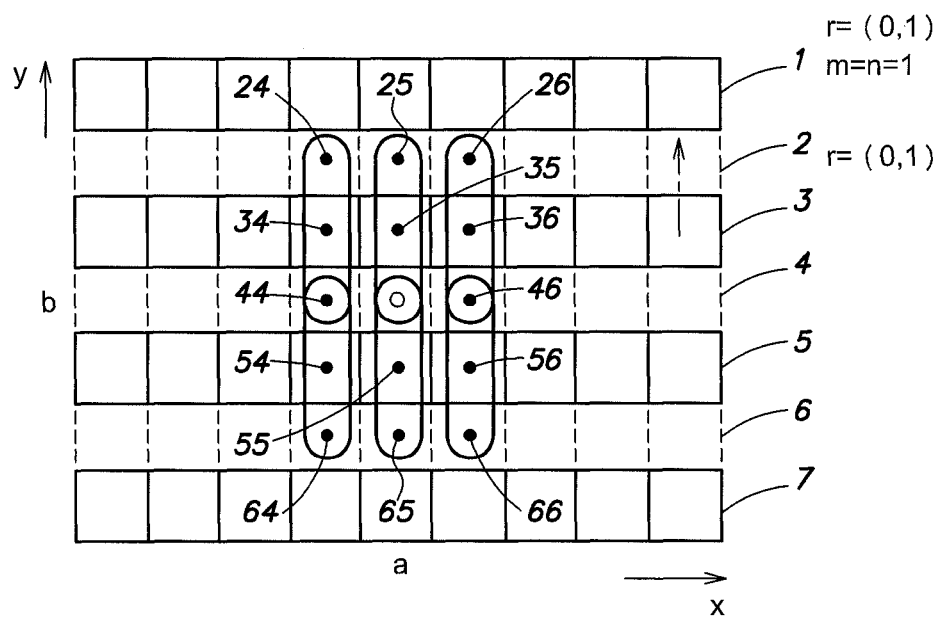

In order to determine a quality measure for this starting interpolation direction, at least one group of image regions is selected that are located adjacent to each other and that are also located within the area of to-be-interpolated image region 45. In the example of FIG. 1b, six such groups of image regions are selected. These groups are highlighted in FIG. 1b by the encircled areas indicated by solid lines. The individual pixels contained in each group are symbolized by points. Each of these groups comprises in the example three pixels that are adjacent in the starting interpolation direction—directly adjacent to each other in the example.

In the example of FIG. 1b, the individual groups each comprise an original pixel and two to-be-interpolated pixels. The original pixels here are 34, 35, 36, and 54, 55, 56 which are located in the image lines 3 and 5 above and below the to-be-interpolated interline 4, and of which the pixels 35, 55 have the same position in the x-direction as the to-be-interpolated pixel 45. The remaining pixels 34, 36, and 54, 56, each lie in the x-direction displaced by one pixel relative to the pixel 45 to be interpolated.

The two additional pixels of such a group are each located in the starting interpolation direction directly adjacent to the original pixel 34-36, or 54-56, where one of the two pixels adjoins the respective original pixel 34-36 or 54-56 in a direction corresponding to the starting interpolation direction, while the other of the two pixels adjoins these original pixels in a direction opposite the starting interpolation direction.

Subsequently, for each of these groups one single quality measure is determined which indicates how strongly the image information values for the pixels of a group which are adjacent to each other deviate from each other. The sum of these individual quality measures is then used as the quality measure for the starting interpolation direction in the region of the to-be-interpolated pixel 45.

In the example shown in FIG. 1b, the groups of image regions utilized to determine the quality measure for the starting interpolation direction are selected such that two of them contain the to-be-interpolated pixel 45 and that the groups contain additional to-be-interpolated pixels from the interlines 2, 4, and 6, that is, pixels 24-26, 44, 46, 64-66. Before determining the quality measure for the starting interpolation direction, starting interpolation values must be assigned both to the to-be-interpolated image region 45 and to the remaining to-be-interpolated image regions. This is effected by generating an interpolation value from the image information values of the original pixels which are located adjacent in the starting interpolation direction to the respective pixel to be interpolated. This interpolation can be effected, for example, using a low-pass filter. The starting interpolation value $S45=S(a, b)$ for the to-be-interpolated pixel 45 can thus be generated by a low-pass filtering of the pixels 35, 55 immediately adjacent in the starting interpolation direction, such that:

$$S45=S(a,b)=TP[S(a,b+1); S(a,b-1)] \quad (2).$$

The term TP[.] here is understood to mean a low-pass filtering of the image information values indicated in the brackets, where in the simplest case this can entail generating a mean value.

In analogous fashion, starting interpolation values for the remaining to-be-interpolated image information values 24-26, 44, 46, 64-66 are determined which are contained in the groups of image regions.

It should once again be pointed out in this connection that the generation of these starting interpolation directions for the to-be-interpolated pixel 45 and for the remaining to-be-interpolated pixels is required only if the individual groups which are to be examined during generation of a quality measure for the starting interpolation direction comprise the to-be-interpolated image region 45 and any possible additional to-be-interpolated image regions.

The determination of the individual quality measures comprises, for example, a high-pass filter. For example, the group with the pixels 25, 35, 45 that contains the to-be-interpolated pixel 45 will now be considered. The applicable equation for the individual quality measure in the starting interpolation direction for this group is:

$$M'(0,1)=HP[S25,S35,S45] \quad (3).$$

M'(0,1) here denotes an individual quality measure for the examined image direction (0,1); HP[.] denotes a high-pass filter for the image information values indicated in brackets.

The filter coefficients of this filter are, for example: : −0.25, 0.5, −0.25, so that, for example:

$$M'(0,1) = -0.25 \cdot S25 + 0.5 \cdot S35 - 0.25 \cdot S45 \qquad (4).$$

The value of this individual quality measure becomes smaller the less the image information values of the pixels adjacent to each other in the starting interpolation direction deviate from each other. For the above-described numerical example, the individual quality measure is zero when the image information values of an examined group of image regions are each of equal size.

The quality measure for the starting interpolation direction is determined by summing the absolute values of the individual quality measures for the individual groups; the applicable equation is thus:

$$M(0,1) = \Sigma |M'(0,1)| \qquad (5a).$$

The symbol Σ here represents the sum of the individual quality measures of all examined groups.

Instead of the absolute values, it is also possible to sum the squares, or any other integer powers, of the individual quality measures for these individual groups, such that the applicable equation is:

$$M(0,1) = \Sigma (M'(0,1))^{2p} \qquad (5b).$$

where p represents any integer not equal to zero.

In applying the high-pass filter to determine the quality measure, the rule is that the value of the quality measure becomes smaller the less the image information values of the image regions located adjacent to each other in the examined starting interpolation direction deviate from each other.

The number of image regions of a group examined to determine the quality measure is, of course, not limited to only three image regions. It is of course understood that more than three image regions located adjacent to each other in the starting interpolation direction can be examined, that is, can be subjected to a high-pass filter.

Figure 1C:
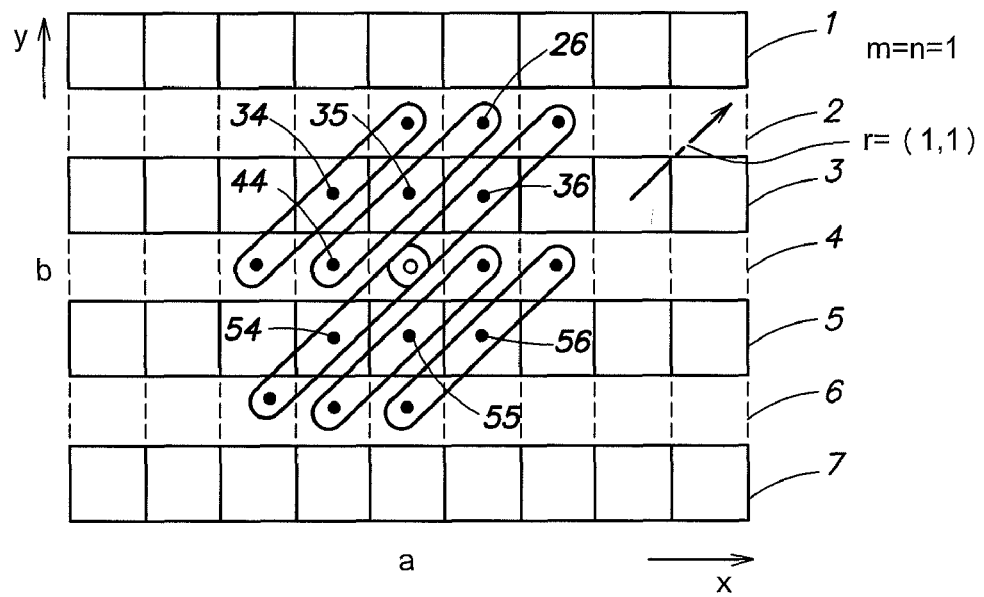

A quality measure is determined for at least one additional image direction which deviates from the starting interpolation direction, as is explained below with reference to FIG. 1c. In the example, it is assumed that the direction r=(1,1) is examined as the additional image direction. The quality measure here is determined as a function of the image information values of at least one group of image regions that are located adjacent to each other in this image direction. In the example of FIG. 1c, six such groups of image regions are generated which in the example again each comprise the original regions 34-36 and 54-56 surrounding the to-be-interpolated image region 45. In the example, each of these groups comprises, in addition to one each of the original image regions 34-36, 54-56, two additional image regions that are located in the examined image direction r=(1,1) adjacent to the respective original image regions 34-36, 54-56. Of these additional image regions, one is located in the examined image direction r=(1,1), and one opposite this image direction r=(1,1) adjacent to the respective original image direction. In order to describe a group of image regions that are located adjacent to each other in a given image direction, the following notation is employed below:

$$[(x,y); r=(dx,dy); m,n].$$

The term (x, y) here denotes the coordinates of a pixel from this group. The term r denotes the examined image direction. The term m denotes the number of pixels that are contained in the group starting from the pixel at coordinates (x, y) in the image direction r, while n denotes the number of image regions that are contained in the group starting from the image region at coordinates (x, y) opposite this image direction r, so that:

$$[(x,y); r; m,n] = [(x,y); (x+i \cdot dx, y+i \cdot dy) \text{ where } i=1 \ldots m; (x-j \cdot dx, y-j \cdot dy) \text{ where } j=1 \ldots n] \qquad (6).$$

For example, for [(a, b+1); r=(1,1); 1,1] one obtains the group of image regions with the original image region 35, which has the coordinates (a, b+1), and with the two pixels 26, 44 located in direction r=(1,1) adjacent to that for the original image region 35, which pixels have the coordinates (a+1, b+2) and (a−1, b).

It must be pointed out that the parameters m, n, which determine the number of pixels of a group, can be selected virtually arbitrarily, where the number of image regions of an examined group increases with parameters m, n.

Using the nomenclature introduced above, the quality measure for a group of image regions can be represented as follows:

$$M'(r) = HP[S(x,y); r; m,n] \qquad (7).$$

The term HP[.] again designates a high-pass filter function, the filter parameters of which are adjusted to the number of image information values S(.) to be filtered.

The applicable equation for the quality measure of an examined image direction is then:

$$M(r) = \Sigma M'(r) \qquad (8).$$

Figure 1D:
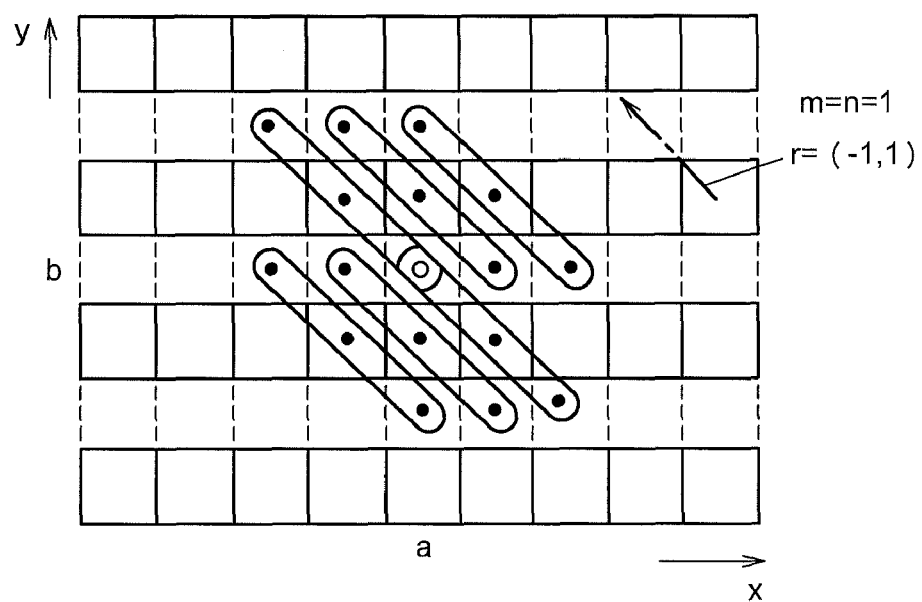

With reference to FIG. 1d, the quality measure for an additional image direction is preferably determined which, based on the starting interpolation direction defined at the beginning of the procedure—in the above-described example r=(0,1)—is symmetrical to the additional image direction r=(1,1). FIG. 1d shows six groups of image regions which again comprise the original pixels 34-36 and 54-56, and which each comprise three pixels located adjacent to each other in the image direction r=(−1,1). The image direction r=(−1,1) here is symmetrical relative to the previously examined image direction r=(1,1) based on the starting interpolation direction r=(0,1).

The quality value determined for this additional image direction r=(−1,1) is hereinafter designated as M(−1,1).

In the next method step, the quality measures of the previously examined image directions, that is, starting interpolation direction r=(0,1) and the two additional image directions r=(1,1) and r=(−1,1), are compared to determine the "best image direction." The best image direction here is the image direction for which the quality measure indicates the least deviation for pixels located adjacent to each other. The image direction for which the smallest quality measure is then determined is then selected as the interpolation direction, and an image information value is interpolated for the to-be-interpolated image region 45 using those image regions that are located adjacent to each other in the interpolation direction.

The interpolation direction determined based on the comparison of quality measures is hereinafter denoted as ri. The applicable equation for this interpolation direction in terms of the above-described example, in which the direction r=(0,1) constitutes the starting interpolation direction, and the directions r=(1,1) and r=(−1,1) constitute additional image directions is:

$$ri = [\min(M(0,1), M(1,1), M(-1,1))]^{-1} \qquad (9).$$

The term min(.) here denotes a minimum function which determines the minimum of the values indicated within the parentheses. The term [.]$^{-1}$ denotes a function which for a given quality measure returns the direction for which this quality measure has been determined.

Figure 1E:
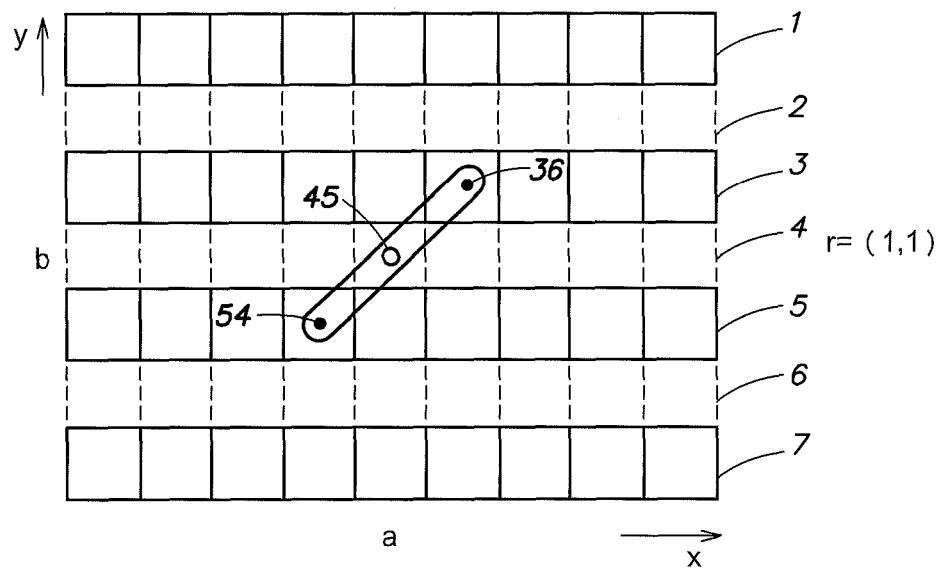

The interpolated image information value is generated, for example, by low-pass filtering of image information values of these image regions that are located in interpolation direction ri adjacent to the to-be-interpolated pixel 45. Assuming that the direction r=(1,1) has been determined as interpolation direction ri, the interpolated image information value S45=S(a, b) can be interpolated, for example, by low-pass filtering of the pixels 36, 54 located adjacent in direction r=(1,1), as is illustrated in FIG. 1e.

In general, the applicable relationship for the interpolation value is:

$$S(a,b)=TP[S(a,b); r=ri; m,n] \quad (10).$$

Preferably, the image regions utilized for a low-pass filter to determine the interpolated image information value S(a, b) are limited to image information values of the original image regions, that is, the group of image regions [(a, b); r=ri; m, n] is selected under the secondary condition that only image information values from original image regions are elements of this group.

After determination of the interpolation value S45, at least one additional iteration step is performed in which the quality measure for at least one additional image direction is determined. This additional image direction is preferably selected such that the angle between this additional image direction and the starting interpolation direction r=(0,1) specified at the beginning of the procedure is greater than the angle between this starting interpolation direction and the image direction examined in the previous iteration step r=(1,1).

Figure 1F:
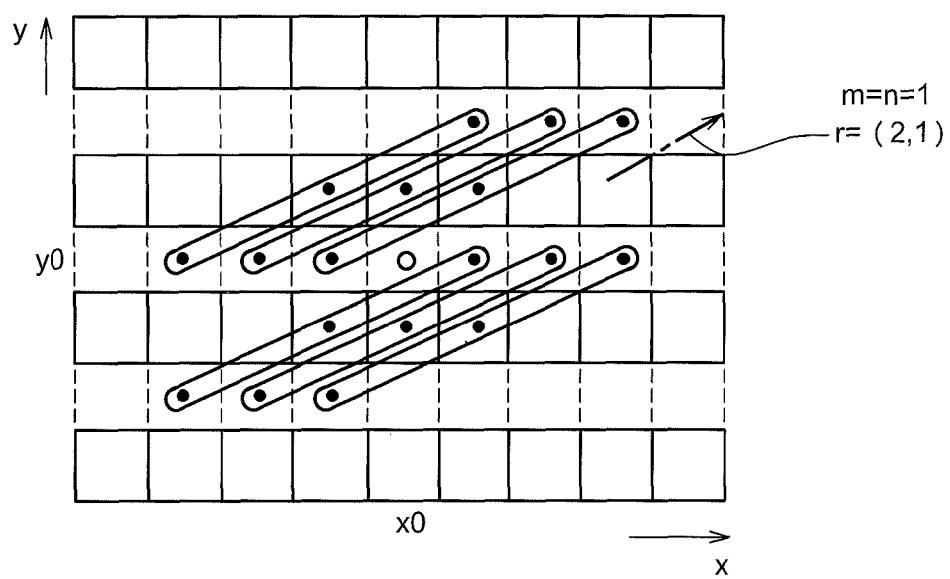

With reference to FIG. 1f, the image direction r=(2,1) is examined as an additional image direction. FIG. 1f shows six groups of pixels, each again comprising the original pixels 34-36 and 54-56. In addition to one of these original pixels, each group comprises two additional pixels which in the examined image direction lie adjacent to the respective original pixel. In this example, the to-be-interpolated pixel 45 is a component of one of the groups of image regions examined to determine the quality measure for the direction r=(2,1). These groups of image regions also comprise additional to-be-interpolated image regions, so that before determination of the quality measure for this direction r=(2,1), image information values must be assigned to these to-be-interpolated image regions. This operation is effected by implementing the method steps explained above for the image region 45 for each of these image regions—that is, in the surrounding area of each of these additional to-be-interpolated image regions the quality measure is determined for the starting interpolation direction and at least one additional image direction, and an image information value for the given image region is interpolated using the image information values for these image regions located adjacent to each other in the "best image direction."

Figure 1G:
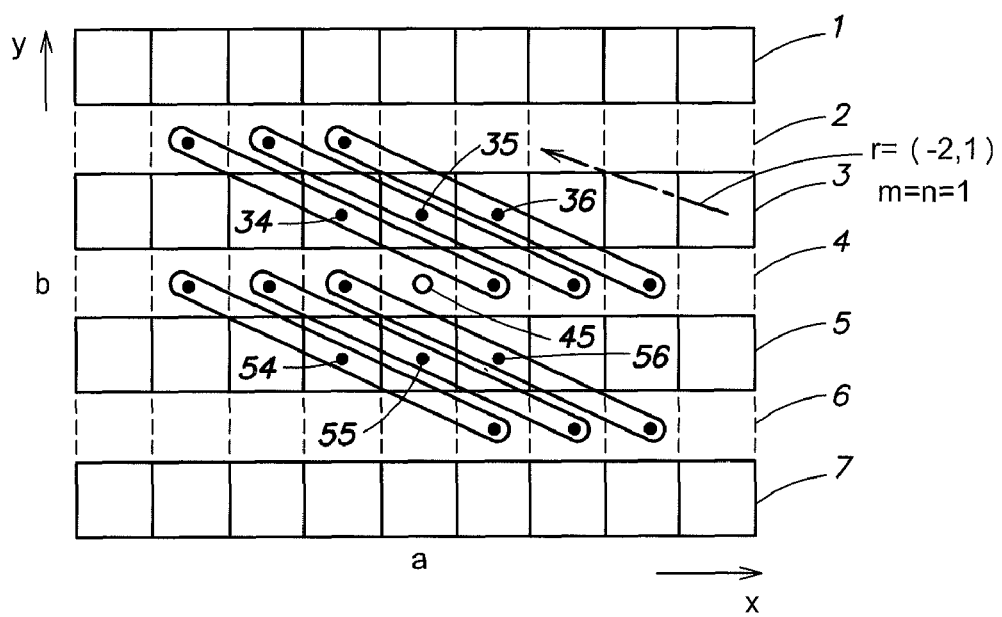

A quality measure M(2,1) for the image direction r=(2,1) is determined based on the groups shown in FIG. 1f. With reference to FIG. 1g, additional groups of image regions are used to determine a quality measure for the direction r=(−2,1) which is symmetrical relative to direction r=(2,1).

Subsequently, the minimum of these two quality measures M(2,1) and M(−2,1), and of the quality measure M(1,1) for the interpolation direction from the previous iteration step forming the starting interpolation direction to perform the current iteration step, are determined in order to determine a "new" interpolation direction. To the extent this interpolation direction deviates from the previous interpolation direction, a new interpolation value is determined for the to-be-interpolated image region 45, where image information values are utilized for this purpose that are located adjacent to each other in the new interpolation direction.

These previously described iteration steps in which in each case the quality measure for a previous best interpolation direction is compared with the quality measure for at least one additional interpolation direction can be repeated as often as necessary until an end condition has been reached. This end condition can be reached, for example, when the quality measure for the interpolation direction falls below a specified minimum value, or when a specified maximum number of iteration steps has been reached.

To the extent the image information values of additional to-be-interpolated intermediate regions are required to determine the quality measure of an interpolation direction, before implementing a $k^{th}$ iteration step for the to-be-interpolated image region the iteration step k−1 must be implemented for the additional to-be-interpolated image regions, where k is any integer greater than two. To the extent the individual iteration steps are implemented in parallel for multiple image regions, preferably the same image directions are examined in identical iteration steps, that is, iteration steps with the same number. The quality measure for the same additional image direction is thus compared with the quality measure for the starting interpolation direction, for example, in the $k^{th}$ iteration step for all the to-be-interpolated image regions.

The essential method steps of the method according to the invention are described once again below based on the flow diagram of FIG. 2.

In a first step 101, an image direction ri is specified as the first interpolation direction or starting interpolation direction. In a next step 102, a first interpolation value S(a,b) is optionally generated by interpolation in this starting interpolation direction ri for the to-be-interpolated image region. This interpolation is required whenever the to-be-interpolated image region is needed for the following determination of the quality measures.

In a next step 103, a quality measure for interpolation direction ri is determined based on image regions in the surrounding area of the to-be-interpolated image region (a,b).

In a next step 104, at least one additional image direction r different from interpolation direction ri is selected, and a quality measure for this additional image direction r is determined.

Subsequently, in a step 105, the "best" image direction out of the group of the interpolation direction and the at least one image direction is determined by comparing the quality measures, and the "best" of these image directions is accepted as interpolation direction ri.

Subsequently, in a step 106, an interpolation value is generated for the to-be-interpolated image region by interpolating the image information values of those image regions that are located adjacent to each other in the interpolation direction. To the extent the image may contain additional to-be-interpolated image regions beyond the one to-be-interpolated image region, preferably only those image regions are utilized for the interpolation that are original image regions in this step.

Subsequently, a check is made as to whether an end condition has been reached, which condition can be reached, for example, when the "best" quality measure has fallen below a specified minimum value.

To the extent the end condition has not been reached, steps 104-106 are implemented again. The additional image direction r in step 104, which direction differs from interpolation direction ri, is preferably selected, as examined over all of the iteration steps, such that a new image direction is always used with each iteration step. In addition, this image direction r selected in addition to interpolation direction ri in the step 104 is selected such that an angle between the original interpolation direction selected in the step 101 and the additional examined interpolation direction r becomes larger from iteration step to iteration step.

If in order to determine the quality measure M(ri) in the step 103 the image information values of at least one additional to-be-interpolated image region are required which differs from the to-be-interpolated image region at the position (a,b), the step 102 is applied to this at least one additional image region, that is, an image information value for this additional image direction is interpolated in the starting interpolation direction.

Accordingly, before each repeated implementation of the steps 104-106, for the to-be-interpolated image region (a,b) these steps 104-106 are implemented for each additional to-be-interpolated image region that is contained in a group of image regions examined for the determination of quality measures M(r), M(ri).

Figure 3A:
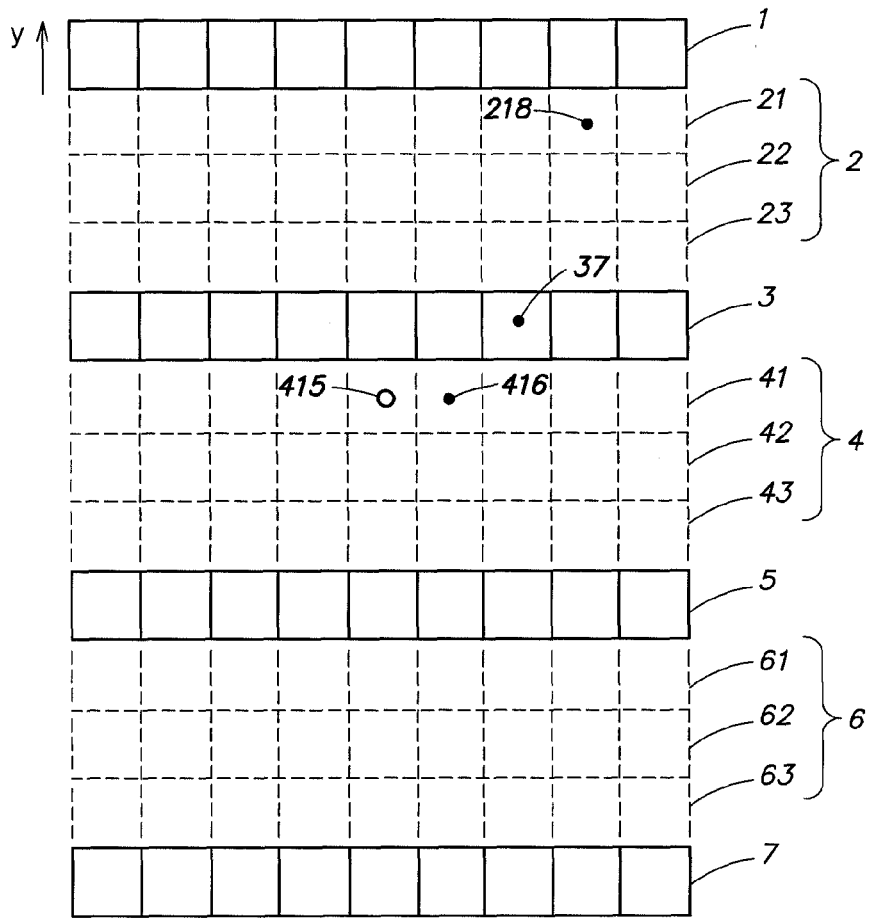
FIGS. 3a-3b illustrate the method according to the invention based on an example for effecting interline interpolation, where more than one interline is to be interpolated.
Figure 3B:
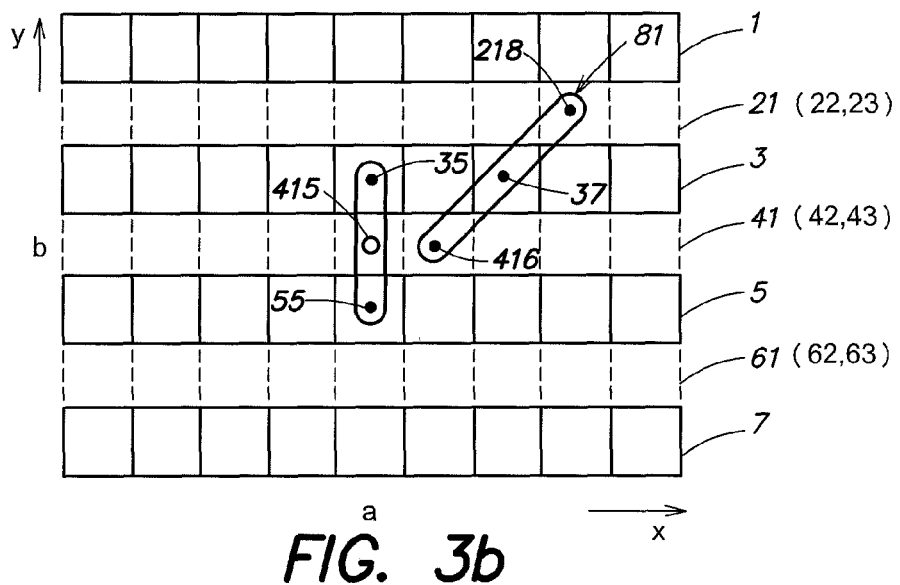

With reference to FIG. 3a-3b, the method is also suitable for interpolating more than one interline between two original lines. Such an interpolation of more than one interline is required, for example, in order to enlarge or rescale a given image. The method described below for interpolating multiple interlines is implemented in a column direction, that is, an appropriate number of "image columns" is interpolated.

FIG. 3a shows sections of an image having the three original image lines 1, 3, 5, 7 between which in each case more than one, in the example, three interlines 21-23, 41-43, 60-63 are to be interpolated.

For purposes of explanation, one pixel 415 is examined from the interline to be interpolated. The interpolation of this pixel is effected based on the interpolation of the pixel 45 as described in FIGS. 1a-1g, the following additional aspects being taken into account.

Both for the purpose of generating an interpolation value for this image region 415 and determining quality measures for image directions in the surrounding area of this to-be-interpolated image region 415, only image information values from original image regions, or the image information values from these image regions which based on the original image lines have the same relative position as to-be-interpolated image region 415, are utilized. If one analogously assigns ranking numbers to the to-be-interpolated interlines between two original image lines, then in the interpolation of the image region 415 only the image regions of those lines may be utilized that have the same ranking number as the line 41 of the image region 415. In other words, in order to interpolate the image region 415 which directly adjoins an original image line in a direction opposing the y-direction, aside from the original image regions only those image regions may be used which also directly adjoin an original image line in a direction opposing the y-direction. In terms of the interpolation of an image region, one can thus imagine that this is reduced to an image shown in FIG. 3b which alternately has one original image line and one interline, where the respective interlines have the same ranking number.

The method already described based on FIGS. 1a-1g for interpolating interlines can be applied to this reduced image shown in FIG. 3b, where the position of a to-be-interpolated image region with respect to the original image regions must be utilized both during low-pass filtering to generate an interpolated image information value as well as for high-pass filtering. During low-pass filtering to generate the interpolated image information value, that image information value is weighted more strongly which lies closer to the to-be-interpolated image region. This is explained below based on FIG. 3b.

Reference number 81 in FIG. 3b identifies a group of image regions which are located adjacent to each other in the reduced image in the direction r=(1,1). This group of image regions comprises the original pixel 37 of the original image line 3, as well as a to-be-interpolated pixel 416 in the to-be-interpolated image line 41, and the to-be-interpolated pixel 218 in the to-be-interpolated image line 21. These pixels are also plotted in FIG. 3a with the corresponding reference numbers. In order to determine a partial quality measure M' for this group 81, the image information values for the image regions of this group are high-pass-filtered, where the applied high-pass filter is selected such that of the to-be-interpolated image regions 416, 218 the image information value of that image region value is weighted more strongly which lies closer to the original image pixel 37. The image information values of the to-be-interpolated image regions here can, in particular, be weighted proportionally to their distance from the image line of the original image pixel 37.

Considering the fact that the distance of the image region 416 from the image region 37 is only one line (see FIG. 3a), while the distance of the image region 218 from the image region 37 is three lines (se FIG. 3a), then the image information value of the image region 416 may be weighted three times more strongly than the image information value of the image region 218. Quality measure M' for the group 218 may be determined as follows:

$$M'_{81}(1,1) = \frac{1}{8} \cdot [-1 \cdot S218 + 4 \cdot S37 - 3 \cdot S416] \quad (11).$$

The coefficients of this high-pass filter are thus $-\frac{1}{8}$, $\frac{1}{2}$, $-\frac{3}{8}$.

In general, the condition for this high-pass filter would be described by:

$$M'_{81}(1,1) = (-c \cdot S218 + (c+d) \cdot S37 - d \cdot S416) \quad (12).$$

The terms c and d here denote respectively the distance between the line with the image region 416 and the line with the image region 37, and the line with the image region 218 and the line with the image region 37.

Analogously, the determination of an interpolated image information value using the image information values of adjacent original image regions is effected by weighting. That image information value of the original image region is thus weighted more strongly which is closer to the to-be-interpolated image region. If the image information value S415 of the to-be-interpolated image region 415 is to be interpolated—for example, in the vertical direction r=(0,1) using image information values S35, S55 from original image lines 3, 5—then the image information value S35 from the image line 3 which lies closer to the to-be-interpolated image region 415 is weighted more strongly. A possible function to generate interpolated image information value S415 may thus be described by:

$$S415 = 0.25 \cdot (3 \cdot S35 + S55) \quad (13).$$

The method which was explained based on the figures up to this point for the interpolation of interline pixels is not restricted to this application. The method is, rather, suitable for interpolating any image information values that are assigned to individual image regions, arranged in a matrix-like fashion, in an image. The method is in particular suitable for increasing the resolution of a motion vector, as is explained below based on FIGS. 4a-4c.

Figure 4A:
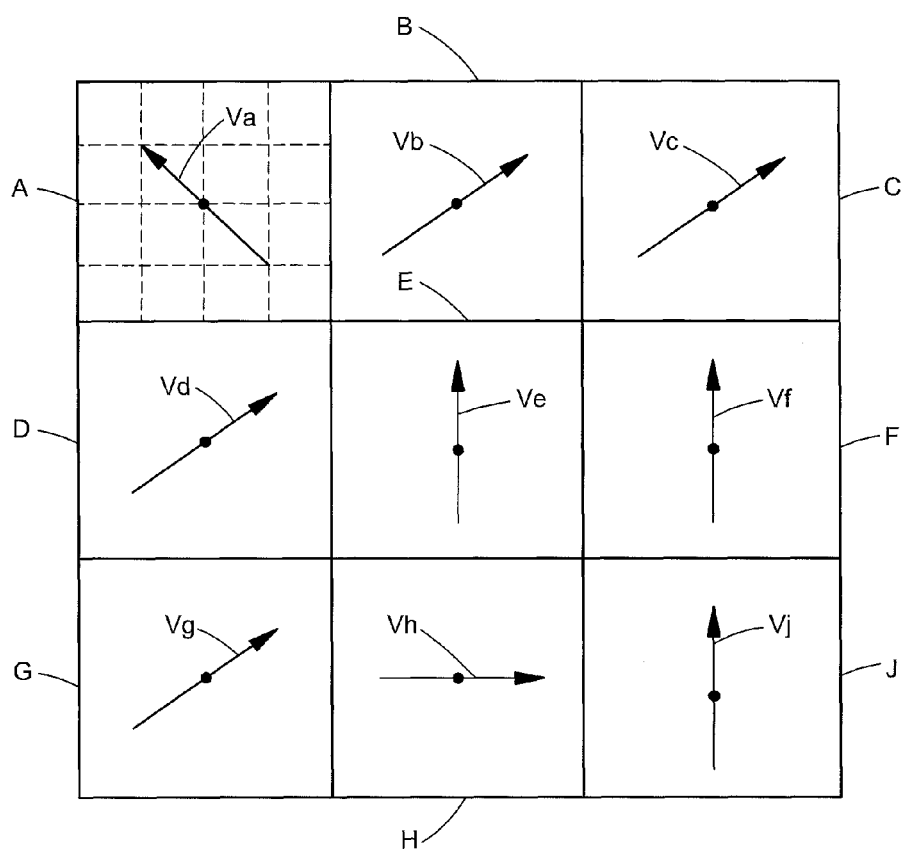
FIGS. 4a-4c illustrate the method according to the invention based on an example for increasing the resolution of a motion vector field.

FIG. 4a shows sections of an image which is subdivided into a number of image blocks A-J to which one motion vector Va-Vj is assigned per block. Each of these image blocks has a number of pixels arranged in a matrix-like fashion, as is illustrated for image block A in FIG. 4a by squares represented by broken lines. Methods for determining motion vectors assigned to individual image blocks are sufficiently known, so no additional explanation is required.

Motion vectors are required correctly to represent the motion sequences during interpolation of intermediate images between two successive images of an image sequence. To achieve the most exact possible rendering of these motion sequences, it is desirable to obtain the highest possible resolution of the motion vector field, that is, to obtain the smallest possible image blocks, to each of which a separate motion vector is assigned.

Figure 4B:
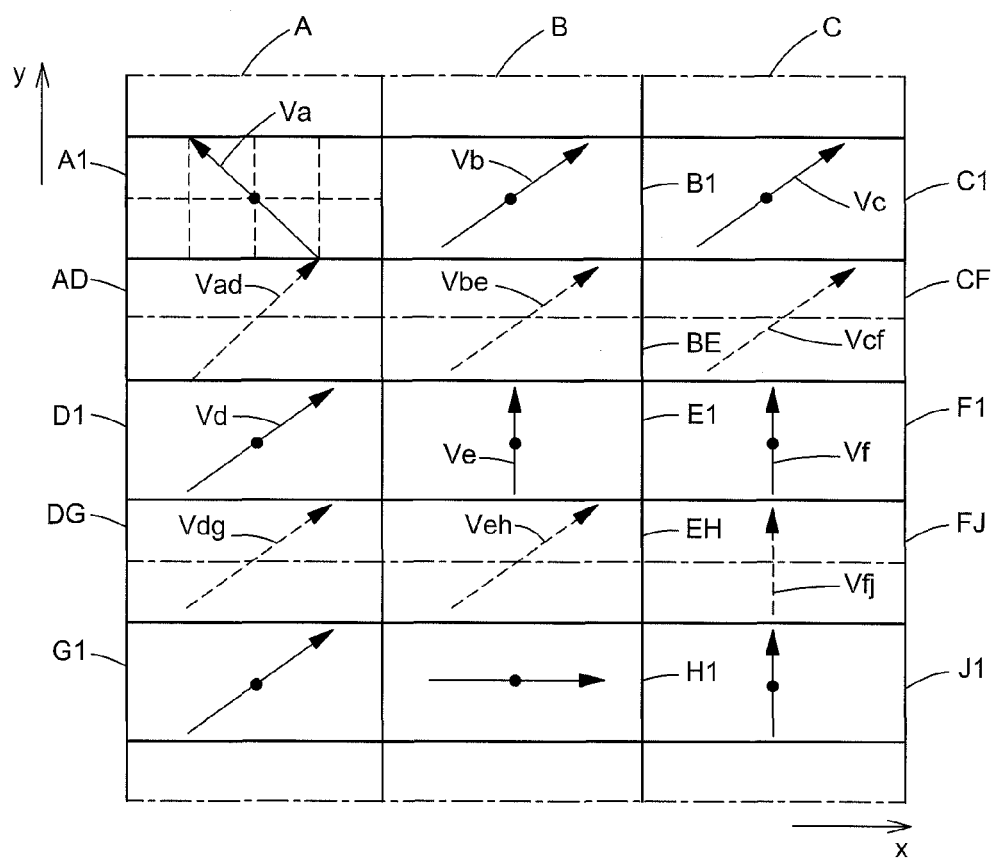

With reference to FIG. 4b, in order to increase the resolution of the motion vector field, the block raster of FIG. 4a, hereinafter designated as the first block raster, must be reduced. The image here is subdivided into a second block raster which comprises a group of first blocks A1-J1 which are each entirely contained within the original image blocks A-J of the first raster. The division of the image is effected here only in one direction, in the vertical direction in the example, which direction is again designated as the y-direction. In the horizontal direction, the blocks initially retain their original width. By subdividing the second block raster into smaller image blocks, a group of second image blocks AD-FJ is created that are each located between two of the first image blocks A1-J1, and that each overlap two adjacent blocks of the first image raster. Each of the image blocks of the second block raster shown in FIG. 4b is preferably of equal size and comprises a number of pixels that are shown as broken-line squares for the image block A1.

In the example, the number of pixels in a block of the second block raster is reduced by a factor of 2 relative to the number of pixels in a block from the first block raster, thereby resulting in an increase in the resolution of the vector field by a factor of 2.

Assigned to the first image blocks A1-J1 of the second block raster are the respective motion vectors of the image blocks of the first raster from which they originated. These first image blocks A1-J1, form original image regions for the implementation of the method. The second image blocks AD-FJ of the second raster, located vertically between the two such image blocks A1-J1 form to-be-interpolated image regions for the implementation of the method. To-be-interpolated image information values for these to-be-interpolated image regions AD-FJ are motion vectors, where each motion vector comprises two motion vector components, an x-component and a y-component. The method must thus be implemented twice for the interpolation of a motion vector for a to-be-interpolated image region AD-FJ, that is, once for the x-component of the motion vector and once for the y-component of the motion vector. The motion vectors Va-Vj of the original image regions must be subdivided here into their motion vector components, where in a first implementation of the method in which, for example, the x-component of the motion vectors of the to-be-interpolated image regions is determined, only the x-components of the motion vectors for the original image regions are utilized, and where during an interpolation of the y-components of the motion vectors for the to-be-interpolated image regions only the y-components of the motion vectors for the original image regions are utilized.

In FIG. 4b, the broken lines show the interpolated motion vectors for to-be-interpolated image regions AD-FJ which are supplied upon completion of the iterative interpolation method.

Figure 4C:
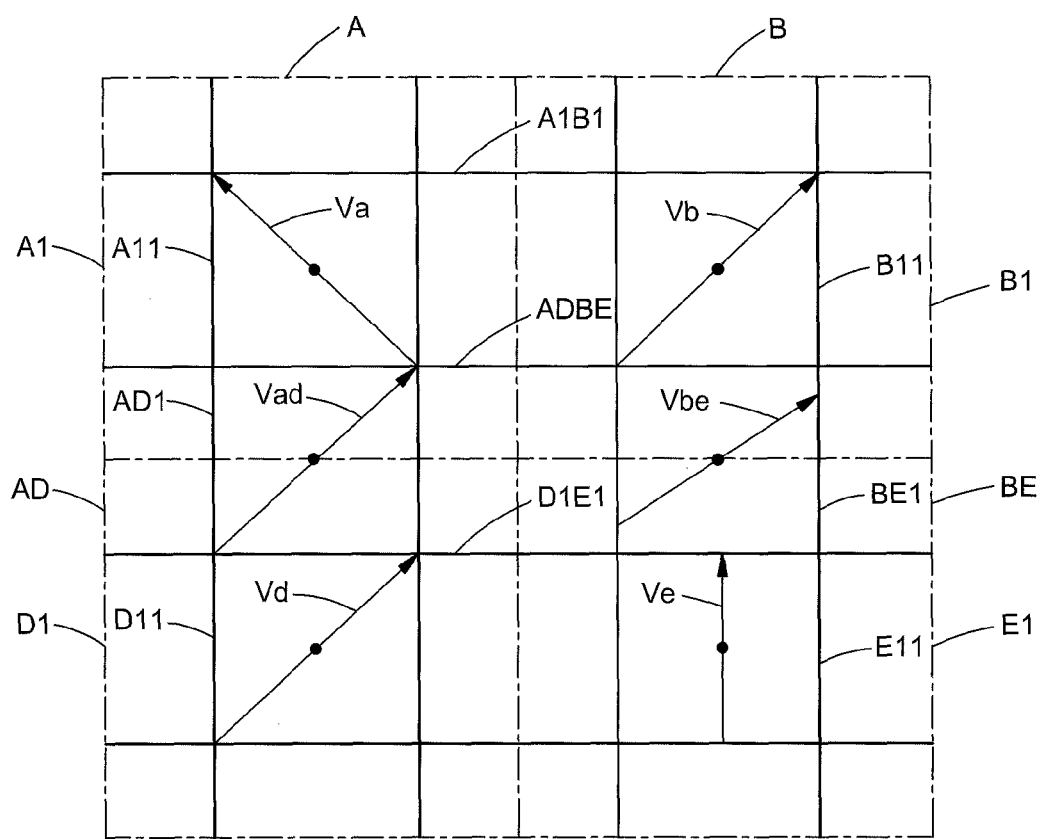

With reference to FIG. 4c, a further resolution of the motion vector field can be obtained in a next step by subdividing the blocks of the second block raster in the horizontal direction into smaller blocks, as illustrated in FIG. 4c for blocks A1, B1, AD, BE, D1, E1. These smaller blocks form a third block raster. This third block raster comprises image blocks that are each completely contained within an image block of the second raster, and to which the motion vectors of these image blocks of the second block raster are assigned. In addition, as a result of the subdivision into the third block raster, intermediate blocks are created that each are formed by two blocks of the second block raster located horizontally adjacent to each other. These image blocks are identified in FIG. 4c by the reference notations A1B1, ADBE, D1E1. These last-referenced image blocks constitute the original image regions for implementation of the method, while image blocks A1-B1, ADBE, D1E1 constitute the to-be-interpolated image regions.

The method for interpolating motion vectors is implemented for this to-be-interpolated image region, where the method is implemented twice—once to interpolate the x-components of the motion vectors, and once to interpolate the y-components of the motion vectors.

The above-described steps can be repeated as often as necessary until a subdivision has been reached in which each block of the block raster comprises only one pixel to which a motion vector has been assigned.

The method for interpolating image information values that are assigned to image regions of an image is also suitable for interpolating one or more image information values for an image block that comprises multiple pixels arranged in a matrix-like fashion and for which—for example, due to a faulty transmission of data—no image information values, or incorrect image information values, are available. Application of the method to the interpolation of image information values for one such image block is described below based on FIGS. 5a-5b.

Figure 5A:
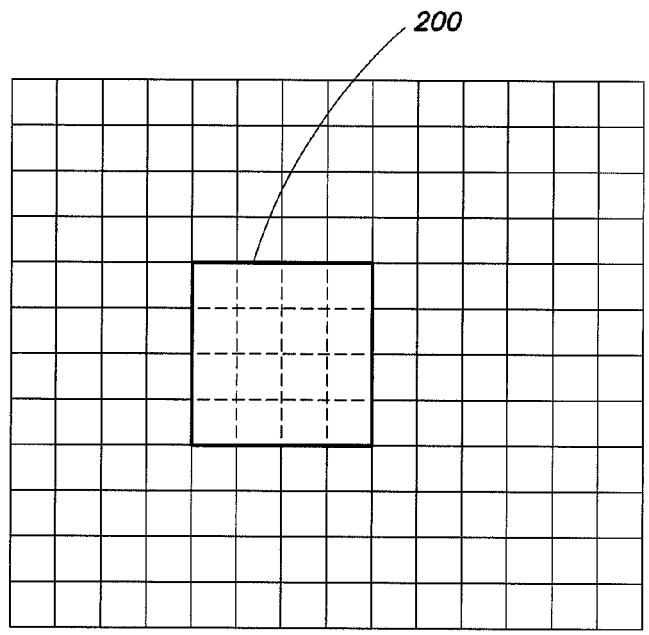
FIGS. 5a-5b illustrate the method according to the invention based on an example for effecting interpolation of a non-transmitted, or incorrectly transmitted, image block comprising multiple pixels during initial method steps.

FIG. 5a shows a section of an image which comprises a plurality of pixels arranged in a matrix-like fashion represented as squares. Image block 200 comprises a number of pixels arranged in a matrix-like fashion—in the example 4×4 pixels—for which no image information values, or incorrect image information values, are available.

Figure 5B:
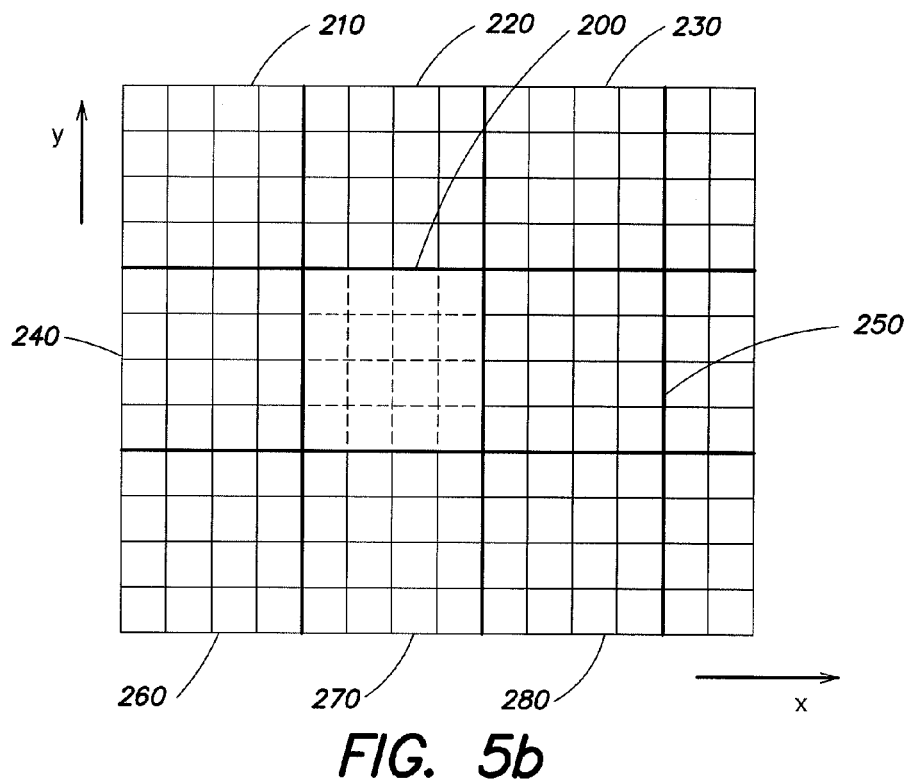

Using the method, a single image information value is first interpolated for this image block 200, which value is assigned to all the pixels in this image block. With reference to FIG. 5b, the pixels of the image in the surrounding area of the to-be-interpolated image block 200 are combined into image blocks 210-280 which are the same size as the to-be-interpolated image block 200, that is, 4×4 pixels.

One image information value each is assigned to these image blocks 210-280 by, for example, implementing a low-pass filtering of the image information values of the individual pixels from these blocks 210-280. These image blocks 210-280 with the image information value assigned to them form original image regions for the implementation of the method. The to-be-interpolated image block 200 forms a to-be-interpolated image region for the implementation of the method.

The previously described iterative interpolation method is implemented using original image regions 210-280 with the image information values assigned to them in order to interpolate an image information value for the to-be-interpolated image block 200.

The resolution of the to-be-interpolated image block is subsequently increased in order to gradually assign image information values to the individual pixels of this block. Various approaches exist for doing this, and these are described below based on FIGS. 6a-6c and 7a-7d.

Figure 6A:
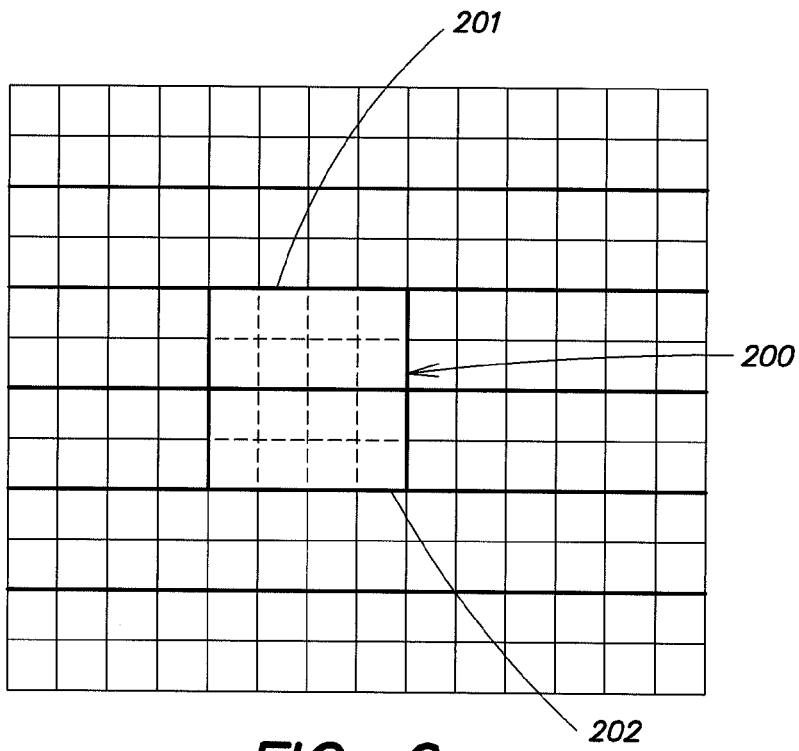
FIGS. 6a-6c illustrate additional method steps for the interpolation of an image block comprising multiple pixels for a first method.

As a first alternative for increasing the resolution, with reference to FIG. 6a, the block 200 is subdivided in one direction—in the example vertically—into equal-sized subblocks 201, 202 to which initially the image information value of the image block 200 is assigned as the starting interpolation value. The pixels within the surrounding area of the to-be-interpolated image block are combined into image blocks of equal size. One image information value each is assigned to the adjacent image blocks created thereby, which image information value is generated, for example, by filtering, in particular low-pass filtering of the image information values for the individual pixels of these blocks. These adjacent image blocks thus form original image regions for the implementation of the method.

The above-described interpolation method is then applied to each of the two blocks 201, 202 in order to assign an image information value to each of these blocks. In the interpolation of the image information value of one of the blocks, a possible approach is to ignore the respective other to-be-interpolated image block, as was described above based on FIGS. 3a-3b for the scaling method. As applied to the situation illustrated in FIG. 6a, this means that for the interpolation of the image information value of one of the blocks 201, 202, only the image information values from the original image blocks are utilized, where these image information values are weighted according to their distance from the to-be-interpolated image block.

In addition, it is possible in the interpolation of the image information value for one of the blocks 201, 202, to treat the other of the two blocks as the original image block and to utilize this other of the two blocks during the interpolation. The image information value of this other image block corresponds here to the image information value determined previously for the block 200. Implementation of the interpolation method then corresponds to the interline interpolation method described based on FIG. 3, with the difference that in the situation of FIG. 6a to-be-interpolated image regions in the image do not regularly repeat.

In a next method step, the resolution of the block is increased further by a factor of 2 by dividing the block 200 horizontally, with the result that four image blocks 203, 204, 205, 206 are created. The method of interpolating image information values, previously described for the blocks 201, 202, is then applied to these four image blocks. The starting interpolation values of these image blocks 202-206 created by subdividing the blocks 201, 202, correspond to the previously interpolated image information value of the block from which they originated by division.

In order to implement the interpolation method, the pixels in the surrounding area of the to-be-interpolated image blocks 203-206 are combined into image blocks of the same size as the to-be-interpolated image blocks 203-206. These image blocks form original image regions for the implementation of the iterative interpolation method.

Whereas, for interpolation of the image blocks 201, 202 of FIG. 6a, the vertical direction is preferably selected as the starting interpolation direction, the method for interpolating the smaller image blocks 203-206 preferably begins with the horizontal direction as the starting interpolation direction. The general rule in interpolating an image information value for a subblock of an image block is that the direction in which division of the image block has been effected to generate the subblock is preferred as the starting interpolation direction.

Figure 6B:
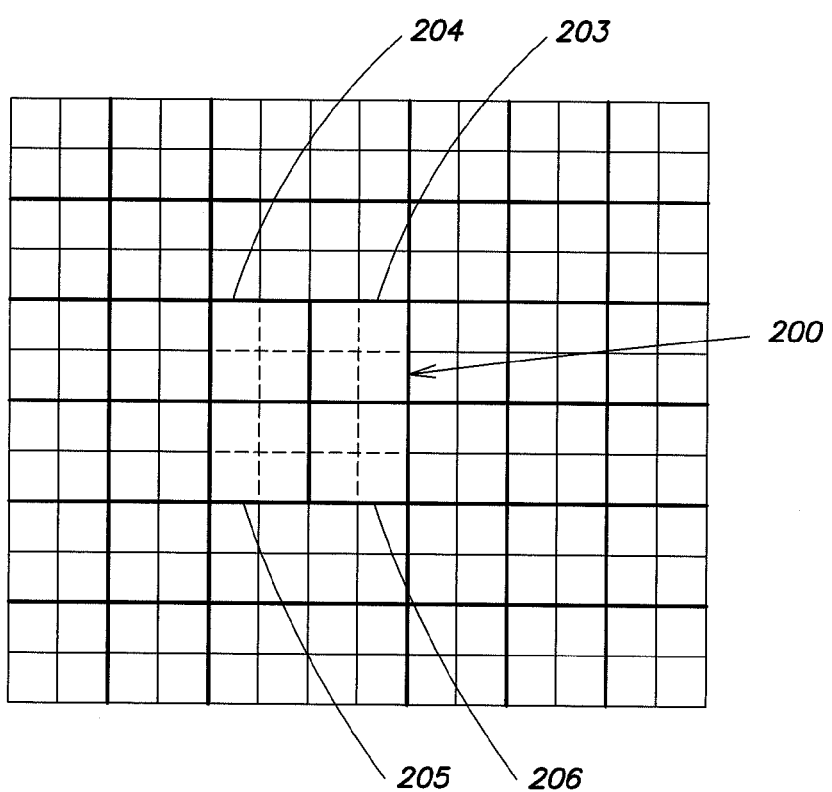
Figure 6C:
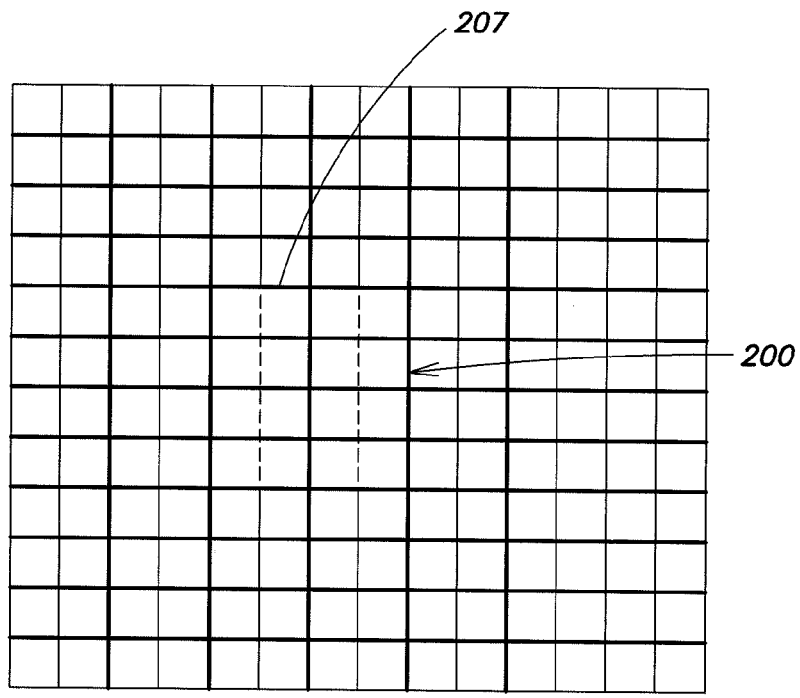

With reference to FIG. 6c, yet another increase in the resolution by a factor of 2 is effected by subdividing the blocks 203-206 vertically into equal-size subblocks, of which one in FIG. 6c is identified by reference number 207. The iterative interpolation method is then applied to each of these subblocks 207, where the image information value for that one of the blocks 202-206 is assigned as the starting interpolation value to individual blocks 207, from which block the respective subblock has originated. For the implementation of the interpolation method, the pixels within the surrounding area of the to-be-interpolated total image block 200 are combined into image blocks, as in the methods described based on FIGS. 6a and 6b, with the size of these image blocks corresponding to the size of the to-be-interpolated subblocks.

After an image information value has been assigned to the individual image blocks 207 by the iterative interpolation method, a further subdivision of these image blocks is effected horizontally and, in the example in which the to-be-interpolated image block comprises 4×4 pixels, a pixel-by-pixel resolution is then attained. The iterative interpolation method is then applied to these individual pixels to assign one image information value to each individual pixel. The previously determined image information values for the image blocks 207, from which they originated, are then used as the starting interpolation values for the individual pixels.

In the method described with reference to FIGS. 6a and 6b, the resolution of the to-be-interpolated image block is successively increased by gradually subdividing the block alternately in the vertical and horizontal directions. It is of course understood that it is also possible to begin first with a subdivision in the horizontal direction.

Figure 7A:
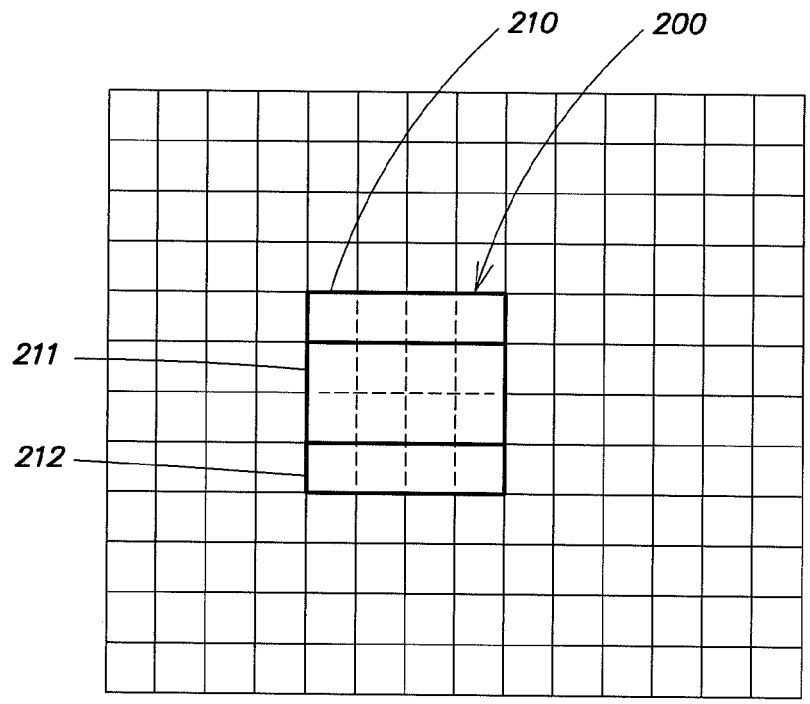
FIGS. 7a-7d illustrate additional method steps for the interpolation of an image block comprising multiple pixels for a second method.
Figure 7B:
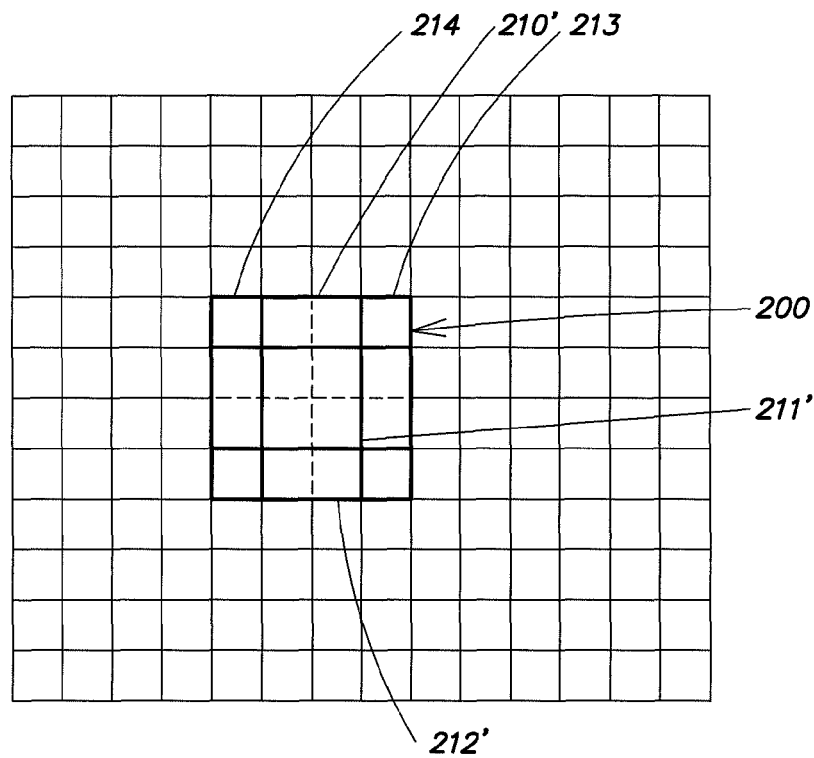

The following discussion describes a method with reference to FIGS. 7a-7b in which the resolution of the block is increased proceeding from the edges of the block.

With reference to FIG. 7a, the to-be-interpolated image block is subdivided in one direction, vertically in the example, into three image blocks: a first, a second, and a third image block 210, 211, 212. The "width" of the first and third image blocks vertically here measures only one pixel; one width of these blocks 210, 212 horizontally measures four pixels in the example. One image information value is then interpolated for each of the pixels from the first and third image blocks using the iterative interpolation method. The pixels of the "middle" image block 211 are treated here as original pixels to which the previously determined image information value of the image block 200 is assigned.

With reference to FIG. 7b, the resolution of the image block is then increased in the horizontal direction by further subdividing the image block horizontally by forming fourth and fifth image blocks 213, 214 which have a width of one pixel horizontally and a width of four pixels vertically. As a result, reduced image blocks 210', 211', 212' are created from the first, second, and third image blocks. For each of these pixels from these fourth and fifth image blocks, an image information value is then determined using the iterative interpolation method. The remaining pixels of the image block, that is, the pixels of the reduced image blocks 210', 211', 212', are treated here as original pixels, to which the interpolated image information values of the first, second, and third image blocks are assigned.

For image blocks 210, 212, 213, 214, after implementation of these method steps, a resolution down to the pixel level has been reached, whereas the central image block 211', having 2×2 pixels and to which only one image information value has been assigned, continues to have a lower resolution. This central image block 211' is subsequently treated like the original block 200 in that its resolution is increased horizontally and vertically proceeding from the edges in "1-pixel steps."

Figure 7C:
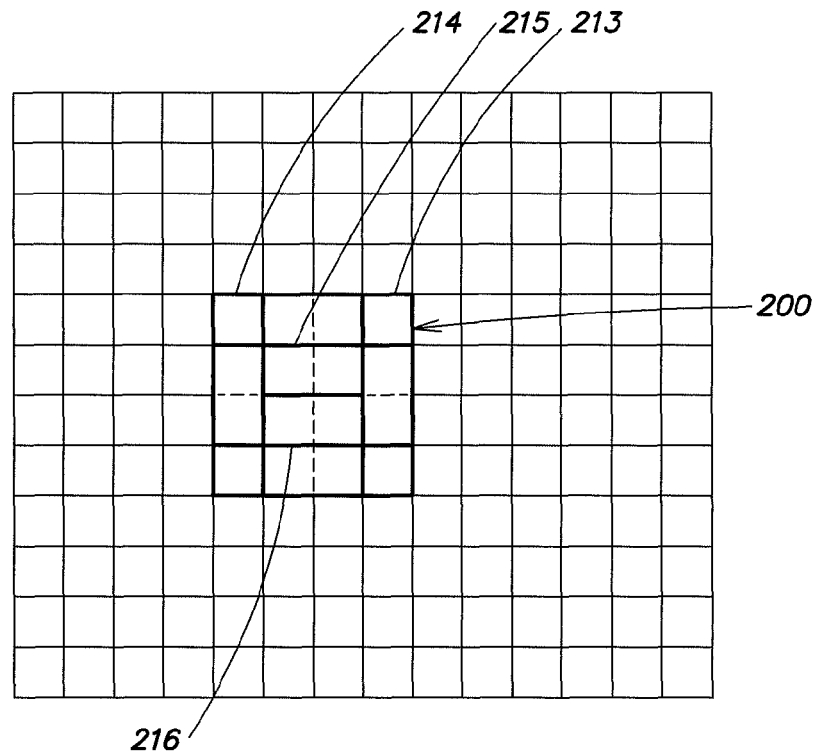

With reference to FIG. 7c, the central image block is for this purpose first further subdivided such that image blocks 215, 216 are created, each with a width of two pixels and a height of one pixel. One image information value is then assigned to each pixel from these blocks 215, 216 using the iterative method.

Optionally, it is possible to continue horizontally with the subdivision into blocks having a width of four pixels and a height of one pixel, and to assign to each of the pixels from these blocks one image information value using the iterative interpolation method. In this case, another image information value is interpolated for the pixels of the blocks 213, 214 lying horizontally adjacent to the central region 211'.

Figure 7D:
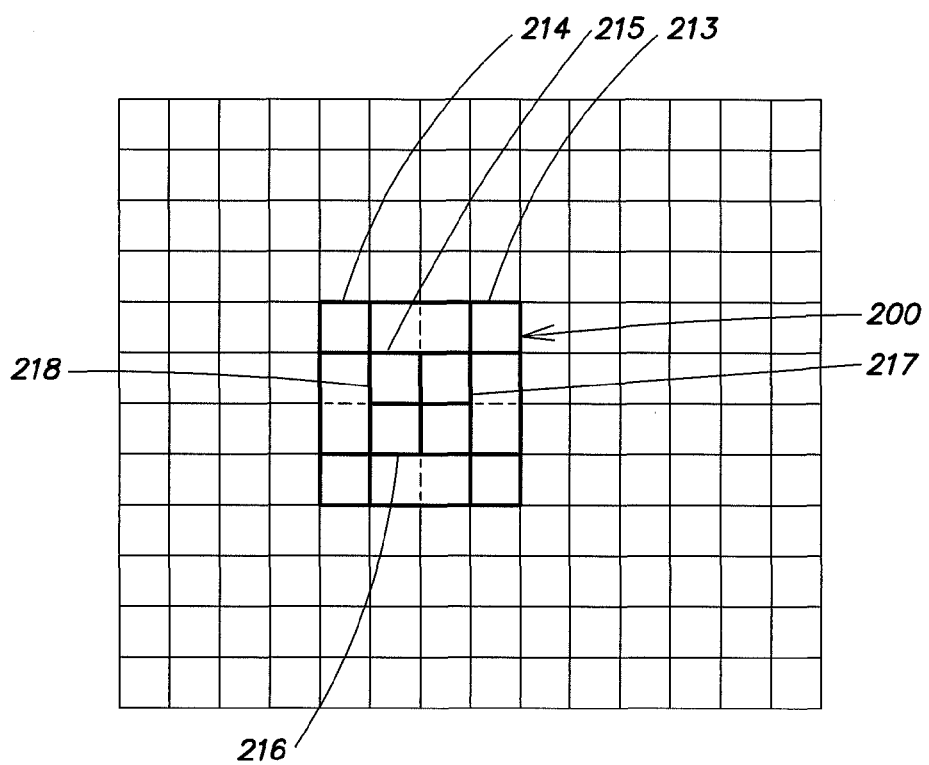

With reference to FIG. 7d, the central image block 211' is then subdivided horizontally by generating image blocks 217, 218, each of which has a width of one pixel and a height of two pixels, and an image information value is assigned by the iterative method to each of the pixels of these image blocks 217, 218.

Optionally, it is possible to continue vertically with the subdivision into blocks of one-pixel width and four-pixel height, and to assign an image information value to each of the pixels from these blocks by the iterative interpolation method. In this case, another image information value is interpolated for the pixels of the blocks 210, 211 that lie vertically adjacent to the central region 211'.

After implementation of these steps, a resolution down to the pixel level has been reached for the originally-to-be-interpolated image block 200. The above-described method can be applied analogously to image blocks having more than 4×4 pixels, where in each case the resolution is increased proceeding from the edges in 1-pixel steps.

Using an approach not shown in greater detail here, is also possible to subdivide the to-be-interpolated block more finely than its surrounding area, that is, subdivide the block to below the pixel resolution. Thus block 200 of FIG. 7a-7d may be subdivided, for example, into 8×8 subpixels, of which 2×2 are to be assigned to one pixel each, and a pixel image information value is to be interpolated for each of these subpixels. Upon completion of this procedure, the image information value for a given pixel is generated from the image information values of the subpixels assigned to the pixel.

This type of procedure can be useful, in particular, in order to obtain a satisfactory interpolation result for a central region also, for example, the region 211' for which the resolution initially remains coarser if the resolution is increased symmetrically proceeding from the edge.

Figure 2:
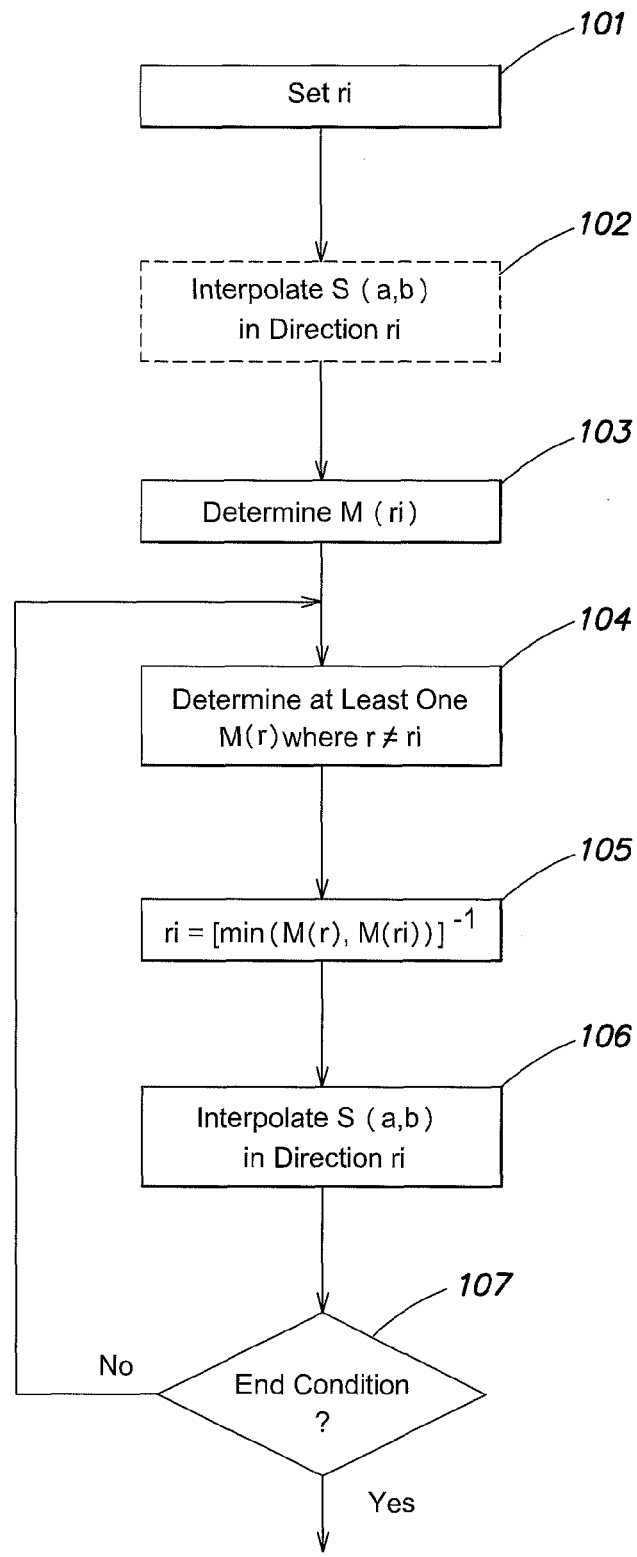
FIG. 2 illustrates a flow diagram for the method.

With reference to the step 105 in FIG. 2, the assumption has been made for the above description of the method that, during the iteration process, in each case one of two interpolation directions has been selected based on a comparison of the quality measures of these interpolation directions, and that an interpolation is effected in this selected direction. This selection presupposes that the quality measures for these interpolation directions deviate from each other. According to a modification of the previously described method, both interpolation directions are used for the interpolation when the absolute value of a difference between quality measures is less than a specified value δ. The steps 105, 106, described in FIG. 2, are then augmented by the method steps described below with reference to FIG. 8.

After method step 104 in which the quality measure M(r) is determined for at least one additional interpolation direction r, in this method a method step 115 is used to determine whether the absolute value of a difference between quality measures is smaller than a specified difference value δ, in other words, whether:

$$|M(r)-M(ri)|<\delta \quad (14)$$

is true. If this condition has been met, two interpolations are implemented in a step 116—a first interpolation in interpolation direction r to obtain a first interpolation value $S_r(a,b)$, and a second interpolation in interpolation direction ri to obtain a second interpolation value $S_{ri}(a,b)$. These interpolation values are then mixed in order to obtain the interpolation value S(a,b) employed during the subsequent process. This mixing is effected, for example, by a weighted addition, as described by:

$$S(a,b)=g1\cdot S_r(a,b)+g2\cdot S_{ri}(a,b) \text{ where } g2=1-g1 \quad (15).$$

The weighting factors g1, g2 here can be specified as fixed, for example, where g1=g2=0.5. Alternatively, weighting factors g1, g2 can be a function of the difference between quality measures such that, for example, that interpolation value is weighted more strongly for which the associated interpolation direction provides the smaller (better) quality measure. The weighting here can become stronger as the difference becomes greater.

The quality measure of the heretofore best direction ri that deviates less than the value δ is stored at this point in order to be compared in a next iteration step with the quality measure of another direction r.

If the condition (14) checked in the step 115 has not been met, the steps 105 already described are implemented for the determination of the best direction ri and for the interpolation in this best direction.

In order to reduce the computational cost, an optional check can be made in step 118, before implementation of the interpolation method in the step 106, as to whether the direction newly examined during the respective iteration step supplies a better quality measure than comparison direction ri. An interpolation is implemented here only if this "new" direction provides a better result. The heretofore determined interpolation result S(a,b), which in reference to step 117 can also be a mixture of at least two interpolation results, continues to be stored until a "better" direction is determined.

Figure 8:
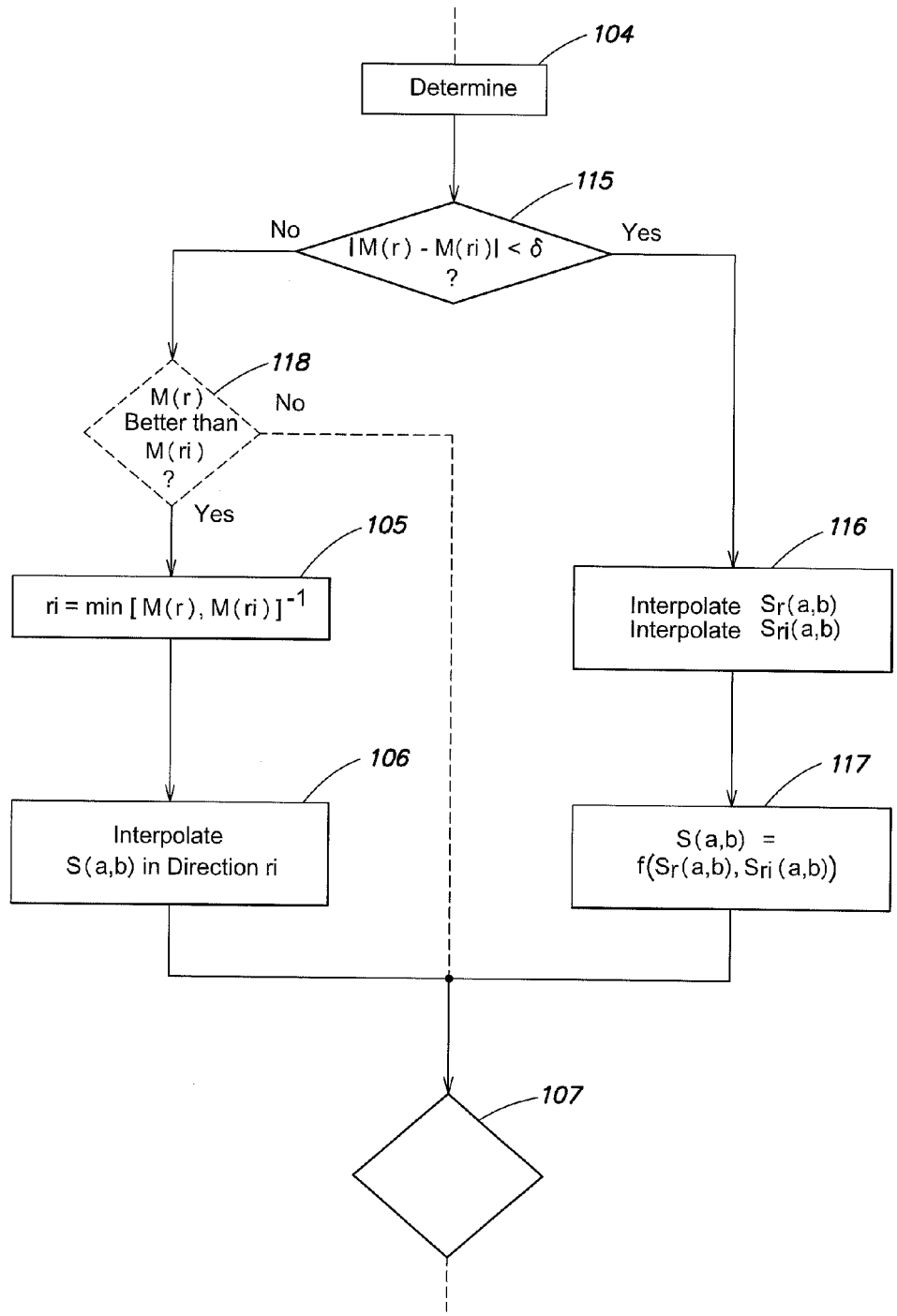
FIG. 8 illustrates another embodiment of the method according to the invention.

According to a modification of the method previously described with reference to FIG. 8, in response to the presence of the condition (14) the interpolation value obtained previously by interpolation in direction ri is retained, instead of implementing a mixture of two interpolation values $S_r(a,b)$, $S_{ri}(a,b)$. In this alternative of the method, the steps 116, 117 are dispensed with.

According to yet another modification of the method, the previously described iteration steps to determine the best interpolation direction are implemented in parallel for multiple adjacent image regions of an image so as to obtain during an iteration step a first interpolation direction for each image region. These interpolation directions, or the directions representing the interpolation directions, are here passed through a filter to obtain a filtered interpolation direction for each image region. A subsequent interpolation is effected for each image region in the direction of the filtered interpolation direction.

Figure 9:
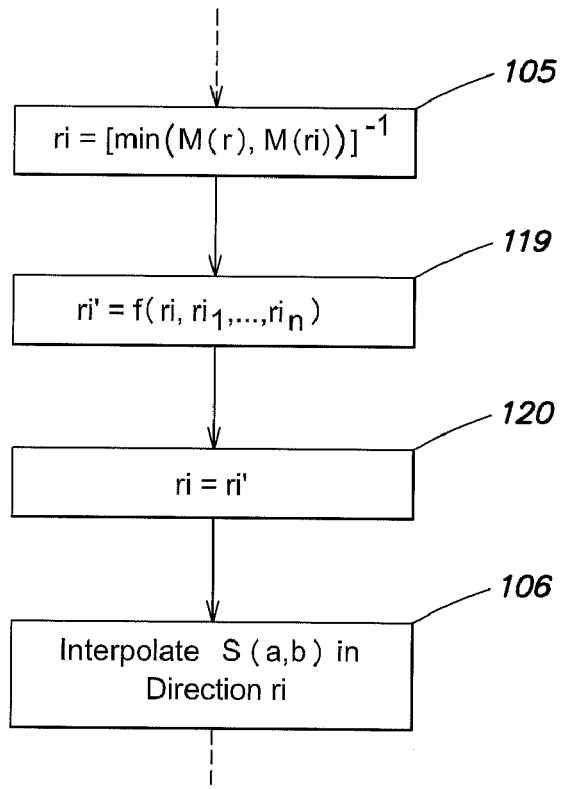
FIG. 9 illustrates an embodiment of the method according to the invention in which an interpolation direction for an image region is obtained by applying a filter utilizing interpolation directions of image regions spatially adjacent to the image region.

FIG. 9 illustrates such a modified method based on a signal flow diagram, where only those method steps modified relative to the previously described method are shown. Between the step 105, in which during each iteration step a best interpolation direction ri for an image region—hereinafter designated as the current image region—is determined, and the step 106, in which interpolation is effected, a filter is implemented in the step 119 which filters the heretofore best interpolation direction of the current image region while taking into account the best interpolation directions determined heretofore of adjacent image regions. The applicable equation is:

$$ri'=f(ri,ri_1, \ldots, ri_n) \quad (16),$$

where ri' denotes the filtered interpolation direction, ri denotes the heretofore best interpolation direction for a given image region, $ri_1 \ldots ri_n$ denotes the heretofore best interpolation directions of adjacent image regions, and f(.) denotes a filter function. This filter can be implemented during each iteration step. In addition, it is also possible to implement this filter only once at the end of the iteration process if the best interpolation direction is available for each image region. These best interpolation directions are then filtered to obtain filtered interpolation directions before a final interpolation is effected in the filtered interpolation directions.

Figure 10:
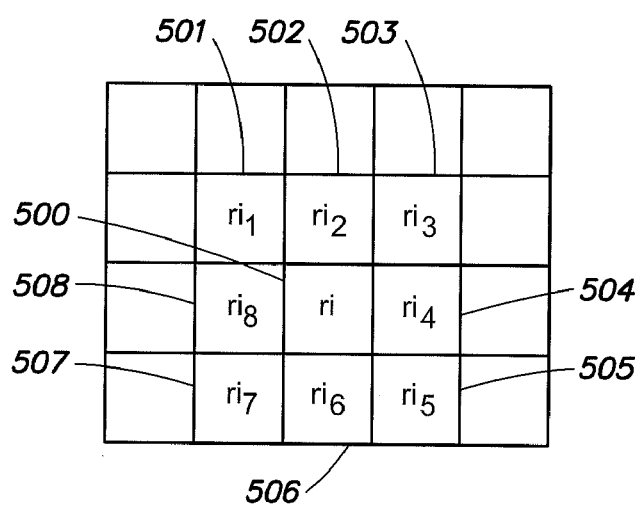
FIG. 10 shows by way of example the adjacent image regions utilized in the filter in the method of FIG. 9.

Starting with an image in which individual image regions are arranged in a matrix-like fashion, for example, the interpolation directions of all the image regions immediately adjacent to the current image region are utilized to filter the interpolation direction of the current image region. This procedure is illustrated in FIG. 10 which schematically shows individual image regions 500-508 and the best interpolation directions $ri_1$-$ri_8$ assigned to the respective image regions 500-508. Here the eight image regions 501-508 with interpolation directions $ri_1 \ldots ri_8$ directly adjoin the image region 500 with interpolation direction ri.

The filter that assigns a filtered interpolation direction ri' to the current image region 500 with the heretofore best interpolation direction ri is, for example, a median filter to which the interpolation direction of the current region and the interpolation directions for the eight surrounding regions are supplied, and which outputs the median of this total of nine interpolation directions as the filtered interpolation direction. In terms of a normalization of image directions r such that a directional component is always "one," one filter of the other directional components of the image directions is sufficient.

The interpolation directions of the image regions can be updated during filtering such that possibly already-filtered interpolation directions are used for filtering additional image regions during a filter run. The filter result here can, however, be dependent on the sequence in which interpolation directions are determined for the individual image regions. If the goal is to avoid this dependence, then only the initially determined—that is, before the filter run—interpolation directions are utilized in the determination of filtered interpolation directions for a group of image regions.

The filtered interpolation direction ri' obtained by the above approach is accepted as the best interpolation direction for the current image region (step 120) and used as the basis of the interpolation in the step 106.

It should be pointed out that individual ones or all of the image regions 501-508 surrounding the to-be-interpolated image region 500 can be original image regions for which image information values are already available. For these original image regions, interpolation directions can be determined, which are subsequently used for the filter, by using the same iterative method steps by which an interpolation direction is determined for a to-be-interpolated image region.

According to one embodiment of the method, the interpolation direction assigned to each given image region of a current image upon completion of the iteration method—that is, after fulfillment of the end condition of the step 107—is "temporally filtered" before implementation of a final interpolation. In order to filter the interpolation direction of a current image region from a current image, at least one interpolation direction is utilized which is assigned to an image region in at least one image that is temporally adjacent to the current image, which image region is located at the same position as the current image region. The final interpolation to determine an interpolated image region is thus effected in an interpolation direction ri'', where:

$$ri''=f(ri,ri_{t-1}) \quad (17).$$

Figure 11:
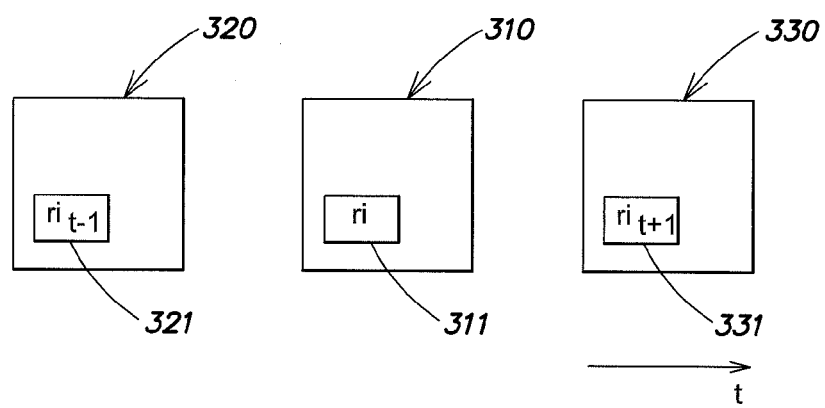
FIG. 11 illustrates an embodiment of the method according to the invention in which an interpolation direction of an image region is obtained by applying a filter utilizing interpolation directions of the image regions temporally adjacent to the image region.

The term ri here denotes a best interpolation direction determined for the image region of the current image upon completion of all the iteration steps, and the term $ri_{t-1}$ denotes the best interpolation direction determined for the image region of a temporally adjacent image upon completion of all the iteration steps, which region is located in this image at the same spatial position as the current image region in the current image. This procedure is illustrated in FIG. 11 in which the reference number 310 denotes a current image, while 320 and 330 denote two images temporally adjacent to the current image. Reference numbers 311, 321, 331 here denote image regions at identical spatial positions in the individual images to which respective interpolation directions have been assigned that have been determined by the previously described iterative method. For the interpolation of the current image region 311, an interpolation direction is used here which is produced by filtering the interpolation directions of image regions that are located spatially at the same position but are sequential timewise.

Although the present invention has been illustrated and described with respect to several preferred embodiments thereof, various changes, omissions and additions to the form and detail thereof, may be made therein, without departing from the spirit and scope of the invention.

What is claimed is:

1. An iterative interpolation method for determining an interpolated image information value in an image which comprises a number of image regions arranged in a matrix-like fashion having original image regions to which one image information value has been assigned, and having at least one image region to be interpolated, comprising the steps of:
   a) specifying a starting interpolation direction;
   b) determining a first quality measure for the starting interpolation direction, which first quality measure is a function of the image information values of at least one group of image regions that are located adjacent to each other in the starting interpolation direction and that are adjacent to the first image region to be interpolated;
   c) selecting at least one image direction different from the starting interpolation direction and determining a second quality measure for this at least one image direction, which second quality measure is a function of image information values from at least one group of image regions that are located adjacent to each other in this image direction, and that are located adjacent to the image region to be interpolated;
   d) comparing the first and second quality measures, selecting as the interpolation direction the starting interpolation direction, or the at least one image direction, as a function of the comparison result, and determining an interpolated image information value using image regions that are located adjacent to the to-be-interpolated image region in the interpolation direction or in a filtered interpolation direction obtained by filtering the interpolation direction;
   e) repeating method steps c) and d) at least once, wherein during the repeated implementation of method step c) the interpolation direction and quality measure of this interpolation direction from the previous method step d)

is employed as the starting interpolation direction and as the quality measure of the starting interpolation direction.

2. The method of claim 1, where the method steps c) and d) are repeated until a specified end condition has been reached.

3. The method of claim 2, where the end condition has been reached when a specified number of iteration steps has been reached.

4. The method of claim 2, where the end condition has been reached when the quality measure assigned to the interpolation direction in step d) has met a specified condition.

5. The method of claim 1, where with each implementation of the method step c) a new image direction is selected that is different from the starting interpolation direction.

6. The method of claim 1, where the at least one of the groups of image regions utilized to determine a quality measure comprises the to-be-interpolated image region.

7. The method of claim 6, where before implementation of the method step b) a starting interpolation value is assigned to the to-be-interpolated image region that is generated by filtering image information values from a group of image regions that are located in the starting interpolation direction adjacent to the to-be-interpolated pixel.

8. The method of claim 1, where the at least one group of image regions has an additional to-be-interpolated image region for the purpose of determining the quality measure and where before a first implementation of the method step b) for the to-be-interpolated image region the method step a) is implemented for the at least one additional to-be-interpolated image region, and in which before each iteration of the method steps c) and d) for the to-be-interpolated image region the method steps c) and d) are implemented for the at least one additional to-be-interpolated image region.

9. The method of claim 8, where the method steps c) and d) for the at least one additional to-be-interpolated image region are interpolated only when the end condition has not been reached for this additional to-be-interpolated image region.

10. The method of claim 1, where the determination of the second quality measure for an image direction comprises the following steps:
determining at least one group of pixels that are located adjacent to each other in the image direction;
high-pass filtering the image information values of the pixels from this at least one group in order to generate a high-pass component; and
determining the second quality measure as a function of the at least one high-pass component.

11. The method of claim 10, where at least two groups of image regions are determined.

12. The method of claim 1, where the method steps a) through d) are implemented in parallel for multiple adjacent image regions, and in which the filtered interpolation direction is obtained for a first image region in method step d) by filtering the interpolation directions of the first image region and of at least one image region located adjacent to the first image region.

13. The method of claim 1, where the image regions that are used to generate an interpolated image information value are original image regions.

14. The method of claim 1, where the image regions comprise pixels and in which the image information values comprise luminance values or chrominance values.

15. The method of claim 13, where the image has a number of first image lines, each comprising a number of pixels to which an image information value is assigned, and in which the image has at least one second image line between two first image lines, the second image line comprising a number of to-be-interpolated pixels, wherein the to-be-interpolated pixel is a pixel of the at least one second line.

16. The method of claim 15, where
the image has at least two second image lines between the first image lines, each of the second image lines having a given distance from the first image line closest in one direction;
and in which the groups of image regions for the interpolation of a pixel from one of the second lines are selected in method steps b) and c) such that they contain only pixels from the first lines, and pixels from those second lines that have the same distance from their respective first image line closest in the one direction as the distance of a second line.

17. The method of claim 1, where the image information value assigned to an image region is a motion vector.

18. The method of claim 17, where the motion vector value comprises a first motion vector component and a second motion vector component, and in which for the to-be-interpolated image region a first interpolated motion vector component is determined by using first motion vector components, and in which for the to-be-interpolated image region a second motion vector component is determined by using second motion vector components.

19. The method of claim 1, where the to-be-interpolated image region comprises a number of pixels arranged in a matrix-like fashion, and in which the original image regions comprise a number of pixels arranged in a matrix-like fashion to which one image information value each is assigned, and in which before implementation of the method steps an image information value is assigned to each original image region, this image information value being a function of the image information values of the pixels.

* * * * *